(12) United States Patent
Schoening

(10) Patent No.: US 12,204,972 B2
(45) Date of Patent: *Jan. 21, 2025

(54) EASILY ATTACHABLE RFID TAG AND METHOD OF MAKING THE SAME

(71) Applicant: A-1 PACKAGING SOLUTIONS, INC., St. Charles, IL (US)

(72) Inventor: Kenneth F. Schoening, St. Charles, IL (US)

(73) Assignee: A-1 PACKAGING SOLUTIONS, INC., St. Charles, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/942,601

(22) Filed: Sep. 12, 2022

(65) Prior Publication Data

US 2023/0010878 A1  Jan. 12, 2023

Related U.S. Application Data

(63) Continuation of application No. 16/855,587, filed on Apr. 22, 2020, now Pat. No. 11,443,158.
(Continued)

(51) Int. Cl.
*G06K 19/06* (2006.01)
*G06K 19/077* (2006.01)

(52) U.S. Cl.
CPC . *G06K 19/07722* (2013.01); *G06K 19/07773* (2013.01)

(58) Field of Classification Search
CPC ............... G06K 19/07; G06K 19/0776; G06K 19/07786; H01L 1/2225; H01L 2924/00; H01Q 1/225
(Continued)

(56) References Cited

U.S. PATENT DOCUMENTS 5,832,814 A  11/1998  Nakatani
6,600,418 B2  7/2003  Francis et al.
(Continued)

FOREIGN PATENT DOCUMENTS

EP  1914671 A1  4/2008
JP  2856242 B2  2/1999
(Continued)

OTHER PUBLICATIONS

International Preliminary Report on Patentability for Application No. PCT/US2021/028560, dated Nov. 3, 2022.
(Continued)

*Primary Examiner* — Daniel St Cyr
(74) *Attorney, Agent, or Firm* — MARSHALL, GERSTEIN & BORUN LLP

(57) ABSTRACT

A location designation RFID tag for use in a storage facility includes an inlay, a first layer disposed on a first side of the inlay and having a first thickness, and a second layer disposed on a second side of the inlay. The first layer has a first thickness and the second layer has a second thickness. The inlay includes substrate, an antenna disposed on the substrate, and an integrated circuit disposed on the substrate. The location designation RFID tag may be easily and non-invasively placed and relocated on a floor of a storage facility in a manner that mitigates, and likely resolves, the issues experienced by known RFID tags when placed on a floor. Utilizing an inlay having a long, thin antenna, reduces the overall thickness of the location designation RFID tag, which allows layers to be disposed on the inlay that include a sufficient thickness to improve durability, mitigate detuning, and allow movable devices to readily pass over the location designation RFID tag.

28 Claims, 8 Drawing Sheets

Related U.S. Application Data

(60) Provisional application No. 62/837,138, filed on Apr. 22, 2019.

(58) Field of Classification Search
USPC .................. 235/492, 487, 462.46, 472.02
See application file for complete search history.

(56) References Cited

U.S. PATENT DOCUMENTS

| | | |
|---|---|---|
| 6,661,278 B1 | 12/2003 | Gilliland |
| 6,664,909 B1 | 12/2003 | Hyde et al. |
| 6,842,327 B1 | 1/2005 | Diorio et al. |
| 6,853,583 B2 | 2/2005 | Diorio et al. |
| 6,873,281 B1 | 3/2005 | Esterberg et al. |
| 6,909,389 B1 | 6/2005 | Hyde et al. |
| 6,943,678 B2 | 9/2005 | Muirhead |
| 6,950,342 B2 | 9/2005 | Lindhorst et al. |
| 6,954,159 B1 | 10/2005 | Cooper et al. |
| 6,958,646 B1 | 10/2005 | Colleran et al. |
| 6,965,142 B2 | 11/2005 | Diorio et al. |
| 6,977,527 B1 | 12/2005 | Hyde |
| 7,026,935 B2 | 4/2006 | Diorio et al. |
| 7,030,786 B2 | 4/2006 | Kaplan et al. |
| 7,038,544 B2 | 5/2006 | Diorio et al. |
| 7,038,603 B2 | 5/2006 | Diorio et al. |
| 7,042,701 B2 | 5/2006 | Diorio et al. |
| 7,049,872 B2 | 5/2006 | Diorio et al. |
| 7,049,964 B2 | 5/2006 | Hyde et al. |
| 7,061,324 B2 | 6/2006 | Diorio et al. |
| 7,071,507 B2 | 7/2006 | Diorio et al. |
| 7,102,438 B1 | 9/2006 | Colleran et al. |
| 7,107,022 B1 | 9/2006 | Thomas et al. |
| 7,116,240 B2 | 10/2006 | Hyde |
| 7,120,550 B2 | 10/2006 | Diorio et al. |
| 7,123,171 B2 | 10/2006 | Kaplan et al. |
| 7,145,203 B2 | 12/2006 | Wang |
| 7,145,370 B2 | 12/2006 | Bernard et al. |
| 7,149,118 B2 | 12/2006 | Diorio et al. |
| 7,177,182 B2 | 2/2007 | Diorio et al. |
| 7,183,926 B2 | 2/2007 | Diorio et al. |
| 7,187,237 B1 | 3/2007 | Diorio et al. |
| 7,187,290 B2 | 3/2007 | Hyde et al. |
| 7,199,663 B2 | 4/2007 | Diorio et al. |
| 7,212,446 B2 | 5/2007 | Diorio et al. |
| 7,215,251 B2 | 5/2007 | Hyde |
| 7,221,596 B2 | 5/2007 | Pesavento et al. |
| D543,976 S | 6/2007 | Oliver |
| 7,233,274 B1 | 6/2007 | Kuhn |
| D546,819 S | 7/2007 | Oliver |
| D546,820 S | 7/2007 | Oliver |
| D546,821 S | 7/2007 | Oliver |
| D546,822 S | 7/2007 | Oliver |
| D547,306 S | 7/2007 | Oliver |
| D547,754 S | 7/2007 | Oliver |
| 7,242,614 B2 | 7/2007 | Diorio et al. |
| 7,245,213 B1 | 7/2007 | Esterberg et al. |
| 7,246,751 B2 | 7/2007 | Diorio et al. |
| D548,225 S | 8/2007 | Oliver |
| 7,253,719 B2 | 8/2007 | Diorio et al. |
| 7,257,033 B2 | 8/2007 | Wang et al. |
| 7,262,092 B2 | 8/2007 | Diorio et al. |
| 7,263,001 B2 | 8/2007 | Wang et al. |
| 7,283,037 B2 | 10/2007 | Diorio et al. |
| 7,283,390 B2 | 10/2007 | Pesavento |
| 7,289,358 B2 | 10/2007 | Pesavento et al. |
| 7,304,579 B2 | 12/2007 | Diorio et al. |
| 7,307,528 B2 | 12/2007 | Glidden et al. |
| 7,307,534 B2 | 12/2007 | Pesavento |
| 7,312,622 B2 | 12/2007 | Hyde et al. |
| 7,315,067 B2 | 1/2008 | Wang |
| 7,315,248 B2 | 1/2008 | Egbert |
| D562,810 S | 2/2008 | Oliver |
| D563,397 S | 3/2008 | Oliver |
| 7,375,398 B2 | 5/2008 | Wang et al. |
| 7,380,190 B2 | 5/2008 | Hara et al. |
| D570,337 S | 6/2008 | Oliver |
| 7,382,257 B2 | 6/2008 | Thomas et al. |
| 7,388,420 B2 | 6/2008 | Diorio et al. |
| 7,388,468 B2 | 6/2008 | Diorio et al. |
| 7,389,101 B2 | 6/2008 | Diorio et al. |
| 7,391,329 B2 | 6/2008 | Humes et al. |
| 7,394,324 B2 | 7/2008 | Diorio et al. |
| 7,400,255 B2 | 7/2008 | Horch |
| 7,403,122 B1 | 7/2008 | Koepp et al. |
| 7,405,659 B1 | 7/2008 | Hyde |
| 7,405,660 B2 | 7/2008 | Diorio et al. |
| D574,369 S | 8/2008 | Oliver |
| D574,370 S | 8/2008 | Oliver |
| 7,408,466 B2 | 8/2008 | Diorio et al. |
| 7,408,809 B2 | 8/2008 | Diorio et al. |
| 7,417,548 B2 | 8/2008 | Kavounas et al. |
| 7,419,096 B2 | 9/2008 | Esterberg et al. |
| 7,420,469 B1 | 9/2008 | Oliver |
| 7,423,539 B2 | 9/2008 | Hyde et al. |
| D578,114 S | 10/2008 | Oliver |
| 7,432,814 B2 | 10/2008 | Dietrich et al. |
| 7,436,308 B2 | 10/2008 | Sundstrom et al. |
| 7,448,547 B2 | 11/2008 | Esterberg |
| 7,472,835 B2 | 1/2009 | Diorio et al. |
| 7,482,251 B1 | 1/2009 | Paulsen et al. |
| D586,336 S | 2/2009 | Oliver |
| D587,691 S | 3/2009 | Oliver |
| 7,525,438 B2 | 4/2009 | Hyde et al. |
| D592,192 S | 5/2009 | Oliver |
| 7,528,724 B2 | 5/2009 | Horch |
| 7,528,728 B2 | 5/2009 | Oliver et al. |
| 7,541,843 B1 | 6/2009 | Hyde et al. |
| 7,557,714 B2 | 7/2009 | Roeder et al. |
| 7,561,866 B2 | 7/2009 | Oliver et al. |
| 7,592,897 B2 | 9/2009 | Diorio et al. |
| 7,616,120 B1 | 11/2009 | Humes et al. |
| D605,641 S | 12/2009 | Oliver |
| D606,056 S | 12/2009 | Oliver |
| D606,057 S | 12/2009 | Oliver |
| 7,633,376 B2 | 12/2009 | Diorio et al. |
| 7,633,377 B2 | 12/2009 | Sadr |
| 7,651,882 B1 | 1/2010 | Bockorick et al. |
| D610,576 S | 2/2010 | Oliver |
| 7,667,231 B2 | 2/2010 | Hyde et al. |
| 7,667,575 B2 | 2/2010 | Husak et al. |
| 7,667,589 B2 | 2/2010 | Desmons et al. |
| 7,667,652 B2 | 2/2010 | Gevargiz et al. |
| D611,037 S | 3/2010 | Oliver |
| D613,276 S | 4/2010 | Oliver |
| 7,696,882 B1 | 4/2010 | Rahimi et al. |
| D617,320 S | 6/2010 | Oliver |
| 7,733,227 B1 | 6/2010 | Pesavento et al. |
| D620,484 S | 7/2010 | Oliver |
| D620,928 S | 8/2010 | Oliver |
| 7,768,248 B1 | 8/2010 | Hyde |
| 7,768,406 B1 | 8/2010 | Peach et al. |
| 7,804,400 B2 | 9/2010 | Muirhead |
| 7,808,387 B1 | 10/2010 | Kuhn |
| 7,830,262 B1 | 11/2010 | Diorio et al. |
| 7,830,322 B1 | 11/2010 | Oliver et al. |
| 7,872,582 B1 | 1/2011 | Diorio |
| 7,873,326 B2 | 1/2011 | Sadr |
| 7,907,899 B1 | 3/2011 | Oliver |
| 7,917,088 B2 | 3/2011 | Hyde et al. |
| 7,920,046 B1 | 4/2011 | Aiouaz et al. |
| 7,969,236 B1 | 6/2011 | Hyde et al. |
| 7,970,484 B2 | 6/2011 | Fontanot |
| 7,973,643 B2 | 7/2011 | Hyde et al. |
| 7,973,645 B1 | 7/2011 | Moretti et al. |
| 7,978,005 B1 | 7/2011 | Hyde et al. |
| 7,982,611 B1 | 7/2011 | Picasso et al. |
| 7,990,249 B1 | 8/2011 | Hyde et al. |
| 7,999,675 B2 | 8/2011 | Diorio et al. |
| 8,044,774 B1 | 10/2011 | Diorio |
| 8,044,801 B1 | 10/2011 | Hyde et al. |
| 8,063,740 B1 | 11/2011 | Diorio et al. |
| 8,072,311 B2 | 12/2011 | Sadr et al. |
| 8,072,327 B2 | 12/2011 | Enyedy et al. |
| 8,072,329 B1 | 12/2011 | Srinivas et al. |

(56) References Cited

U.S. PATENT DOCUMENTS

| | | |
|---|---|---|
| 8,077,013 B2 | 12/2011 | Cooper |
| 8,082,556 B1 | 12/2011 | Aiouaz et al. |
| 8,115,590 B1 | 2/2012 | Diorio et al. |
| 8,115,597 B1 | 2/2012 | Oliver et al. |
| 8,115,632 B1 | 2/2012 | Rahimi et al. |
| 8,120,488 B2 | 2/2012 | Bloy |
| 8,120,494 B1 | 2/2012 | Aiouaz et al. |
| 8,134,451 B1 | 3/2012 | Diorio |
| 8,154,385 B2 | 4/2012 | Aiouaz et al. |
| 8,159,367 B2 | 4/2012 | Hofer et al. |
| 8,174,367 B1 | 5/2012 | Diorio |
| 8,174,369 B2 | 5/2012 | Jones et al. |
| 8,188,927 B1 | 5/2012 | Koepp et al. |
| 8,193,912 B1 | 6/2012 | Gutnik et al. |
| 8,201,748 B2 | 6/2012 | Koepp et al. |
| 8,224,610 B2 | 7/2012 | Diorio et al. |
| 8,228,175 B1 | 7/2012 | Diorio et al. |
| 8,237,562 B1 | 8/2012 | Picasso et al. |
| 8,244,201 B2 | 8/2012 | Oliver et al. |
| 8,258,918 B1 | 9/2012 | Diorio et al. |
| 8,258,955 B1 | 9/2012 | Hyde et al. |
| 8,260,241 B1 | 9/2012 | Hyde |
| 8,279,045 B2 | 10/2012 | Diorio et al. |
| 8,286,887 B2 | 10/2012 | Wilkinson |
| 8,294,582 B1 | 10/2012 | Humes et al. |
| 8,313,594 B2 | 11/2012 | Muirhead |
| 8,325,014 B1 | 12/2012 | Sundstrom et al. |
| 8,325,042 B1 | 12/2012 | Hyde et al. |
| 8,326,256 B1 | 12/2012 | Kuhn |
| 8,332,656 B2 | 12/2012 | Jones et al. |
| 8,344,823 B2 | 1/2013 | Bloy et al. |
| 8,344,857 B1 | 1/2013 | Oliver et al. |
| 8,344,858 B2 | 1/2013 | Bloy |
| 8,350,665 B1 | 1/2013 | Sundstrom et al. |
| 8,354,917 B2 | 1/2013 | Diorio et al. |
| 8,390,425 B1 | 3/2013 | Cooper et al. |
| 8,390,430 B1 | 3/2013 | Sundstrom et al. |
| 8,390,431 B1 | 3/2013 | Diorio |
| 8,391,785 B2 | 3/2013 | Hyde et al. |
| 8,393,547 B2 * | 3/2013 | Kiekhaefer ...... G06K 19/07771 235/487 |
| 8,395,482 B2 | 3/2013 | Sadr et al. |
| 8,400,271 B2 | 3/2013 | Sadr |
| 8,421,631 B2 | 4/2013 | Bloy et al. |
| 8,427,315 B2 | 4/2013 | Aiouaz et al. |
| 8,428,515 B1 | 4/2013 | Oliver |
| 8,493,182 B2 | 7/2013 | Hofer et al. |
| 8,690,057 B2 | 4/2014 | Schoening et al. |
| 8,973,831 B1 * | 3/2015 | Warther ............... B32B 27/32 235/492 |
| 9,224,125 B2 | 12/2015 | Schoening et al. |
| 9,317,823 B2 | 4/2016 | Muirhead |
| 9,436,902 B1 * | 9/2016 | Koepp ............ G06K 19/07752 |
| 9,489,650 B2 | 11/2016 | Schoening et al. |
| 11,443,158 B2 * | 9/2022 | Schoening ......... G06K 17/0022 |
| 2003/0182193 A1 | 9/2003 | Kawamata |
| 2003/0227392 A1 | 12/2003 | Ebert et al. |
| 2004/0102870 A1 | 5/2004 | Andersen et al. |
| 2004/0225384 A1 | 11/2004 | Onishi et al. |
| 2005/0021561 A1 | 1/2005 | Noonan |
| 2005/0192694 A1 | 9/2005 | Toyoshima et al. |
| 2006/0038684 A1 | 2/2006 | Lahiri |
| 2006/0200261 A1 | 9/2006 | Monette et al. |
| 2007/0046439 A1 | 3/2007 | Takaku et al. |
| 2007/0106574 A1 | 5/2007 | Kappel et al. |
| 2007/0115137 A1 | 5/2007 | Lyon et al. |
| 2008/0042838 A1 | 2/2008 | Levin et al. |
| 2008/0068171 A1 | 3/2008 | Ehrman et al. |
| 2008/0079935 A1 | 4/2008 | Vertoprakhov |
| 2008/0136598 A1 | 6/2008 | Chen et al. |
| 2008/0186139 A1 | 8/2008 | Butler et al. |
| 2008/0223274 A1 | 9/2008 | Okuyama |
| 2009/0032367 A1 | 2/2009 | Anthome |
| 2009/0146816 A1 | 6/2009 | Patel et al. |
| 2010/0030353 A1 | 2/2010 | Koishi et al. |
| 2010/0207738 A1 | 8/2010 | Bloy |
| 2010/0219953 A1 | 9/2010 | Bloy |
| 2010/0225480 A1 | 9/2010 | Bloy et al. |
| 2010/0310019 A1 | 12/2010 | Sadr |
| 2011/0000970 A1 | 1/2011 | Abraham |
| 2011/0017832 A1 | 1/2011 | Ritamaki et al. |
| 2011/0027520 A1 | 2/2011 | Lauterbach et al. |
| 2011/0032079 A1 | 2/2011 | Bloy et al. |
| 2011/0063113 A1 | 3/2011 | Hook et al. |
| 2011/0068924 A1 | 3/2011 | Muirhead |
| 2011/0090059 A1 | 4/2011 | Sadr |
| 2011/0090061 A1 | 4/2011 | Hofer et al. |
| 2011/0090062 A1 | 4/2011 | Hofer et al. |
| 2011/0095087 A1 | 4/2011 | Master et al. |
| 2011/0240731 A1 | 10/2011 | Lee et al. |
| 2011/0254664 A1 | 10/2011 | Sadr et al. |
| 2011/0279261 A1 | 11/2011 | Gauger et al. |
| 2011/0282476 A1 | 11/2011 | Hegemier et al. |
| 2012/0066019 A1 | 3/2012 | Hinshaw et al. |
| 2012/0091210 A1 | 4/2012 | Koujima et al. |
| 2012/0112913 A1 | 5/2012 | Bloy |
| 2012/0139704 A1 | 6/2012 | Sadr et al. |
| 2012/0188058 A1 | 7/2012 | Lee et al. |
| 2012/0212331 A1 | 8/2012 | Jones et al. |
| 2012/0229257 A1 | 9/2012 | Kim |
| 2012/0257733 A1 | 10/2012 | Kosseifi et al. |
| 2012/0275546 A1 | 11/2012 | Divsalar |
| 2013/0049925 A1 | 2/2013 | Subramanian |
| 2013/0093572 A1 | 4/2013 | Bloy et al. |
| 2013/0099898 A1 | 4/2013 | Bloy |
| 2013/0099901 A1 | 4/2013 | Jones et al. |
| 2013/0126606 A1 | 5/2013 | Smith |
| 2013/0140368 A1 | 6/2013 | Hwan et al. |
| 2013/0233922 A1 | 9/2013 | Schoening et al. |
| 2014/0224870 A1 | 8/2014 | Schoening et al. |
| 2015/0248606 A1 | 9/2015 | Li |
| 2015/0364814 A1 | 12/2015 | Fujita et al. |
| 2016/0078395 A1 | 3/2016 | Schoening et al. |
| 2016/0101019 A1 | 4/2016 | McDowell |
| 2017/0053239 A1 | 2/2017 | Schoening et al. |
| 2018/0089474 A1 | 3/2018 | Ramon et al. |
| 2018/0162640 A1 | 6/2018 | Lee et al. |
| 2018/0247259 A1 | 8/2018 | Borders et al. |
| 2020/0334511 A1 | 10/2020 | Schoening |

FOREIGN PATENT DOCUMENTS

| | | |
|---|---|---|
| JP | 2008-006516 | 1/2008 |
| KR | 10-2018-0132223 A | 12/2018 |
| WO | WO-2007/086808 A2 | 8/2007 |
| WO | WO-2007086808 A3 | 7/2008 |
| WO | WO-2009/035723 A1 | 3/2009 |

OTHER PUBLICATIONS

Search Report for European Patent Application No. 20794864.7, dated Nov. 18, 2022.
Almaaitah et al., "3D Passive Tag Localization Schemes for Indoor RFID Applications," Exhibit 1015 of Consolidated Inter Partes Reviews IPR2014-01536 and IPR2015-00119 of U.S. Pat. No. 8,690,057.
Decision Institution of Inter Partes Review, Case IPR2014-01536, U.S. Pat. No. 8,690,057 B2, entered Mar. 28, 2016.
Decision Institution of Inter Partes Review, Case IPR2014-01536, U.S. Pat. No. 8,690,057 B2, entered Mar. 30, 2015.
Decision Institution of Inter Partes Review, Case IPR2015-00119, U.S. Pat. No. 8,690,057 B2, entered Arpil 29, 2015.
European Search Report for Application No. 13757623.7, dated Sep. 2, 2015.
Hekimian-Williams et al., "Accurate Localizatoin of RFID Tags Using Phase Difference," Exhibit 1019 of Consolidated Inter Partes Reviews IPR2014-01536 and IPR2015-00119 of U.S. Pat. No. 8,690,057.
International Preliminary Report on Patentability for Application No. PCT/US2013/029408, dated Sep. 9, 2014.
International Search Report and Written Opinion for Application No. PCT/US2013/029408, dated Jun. 26, 2013.

(56) References Cited

OTHER PUBLICATIONS

Miesen, "Where is the Tag?" Ehixibit 1018 of Consolidated Inter Partes Reviews IPR2014-01536 and IPR2015-00119 of U.S. Pat. No. 8,690,057.
Nikitin et al., "Phase Based Spatial Identification of UHF RFID Tags," Intermec Technologies Corporation, Exhibit 1017 of of Consolidated Inter Partes Reviews IPR2014-01536 and IPR2015-00119 of U.S. Pat. No. 8,690,057.
Patent owner response to the Decision of Institution of Inter Partes Review for IPR2014-01536 and IPR2015-00119, filed Jun. 26, 2015.
Petition for Inter Partes Review of U.S. Pat. No. 8,690,057, dated Oct. 23, 2014.
Petition for Inter Partes Review of U.S. Pat. No. 8,690,057, dated Sep. 23, 2014.
Preliminary Response to Inter Partes Review No. IPR2014-01536, dated Jan. 7, 2015.
Preliminary Response to Inter Partes Review No. IPR2015-00119, dated Jan. 30, 2015.
Reply Brief for Inter Partes Review of U.S. Pat. No. 8,690,057 (IPR2014-01536), dated Sep. 28, 2015.
Siragusa et al., "RFID Tags Localization along an axis using a Tunable Near-Field Focused Circular-Phase Array Antenna," of Exhibit 1016 of Consolidated Inter Partes Reviews IPR2014-01536 and IPR2015-00119 of U.S. Pat. No. 8,690,057.
Song et al., "Spaceannotator: A High Precision Location Based Asset Management System in Indoor Environment," Proceedings of ICCTA2011, 1 NEC Labs China, Exhibit 1013 of Consolidated Inter Partes Reviews IPR2014-01536 and IPR2015-00119 of U.S. Pat. No. 8,690,057.
Stelzer et al., "Concept and Application of LPM—A Novel 3-D Local Position Measurement System," Exhibit 1020 of Consolidated Inter Partes Reviews IPR2014-01536 and IPR2015-00119 of U.S. Pat. No. 8,690,057.
Xiong et al., "Design and Implementation of a Passive UHF RFID-Based Real Time Location System," State Key Laboratory of ASIC & System, Fudan University, Exhibit 1014 of Consolidated Inter Partes Reviews IPR2014-01536 and IPR2015-00119 of U.S. Pat. No. 8,690,057.
U.S. Appl. No. 13/857,616, Nonfinal Office Action, Aug. 2, 2013.
U.S. Appl. No. 13/857,616, Notice of Allowance, Nov. 12, 2013.
U.S. Appl. No. 14/190,453, Nonfinal Office Action, Jun. 5, 2014.
U.S. Appl. No. 14/190,453, Nonfinal Office Action, Dec. 4, 2014.
U.S. Appl. No. 14/190,453, Final Office Action, Apr. 20, 2015.
U.S. Appl. No. 14/190,453, Notice of Allowance, Aug. 7, 2015.
U.S. Appl. No. 14/950,192, Nonfinal Office Action, Jan. 4, 2016.
U.S. Appl. No. 14/950,192, Notice of Allowance, Jul. 6, 2016.
First Office Action (Chinese only), Chinese patent application No. 201380012804.7, dated Aug. 3, 2016.
European Office Action for Application No. 13757623.7, dated Jan. 10, 2018.
European Office Action for Application No. 13757623.7, dated Jul. 5, 2018.
International Search Report and Written Opinion issued in PCT Patent Application Publication No. PCT/US2020/029308 dated Aug. 10, 2020.
International Search Report and Written Opinion issued in PCT Patent Application Publication No. PCT/US2021/028560 dated Oct. 20. 2021.
U.S. Appl. No. 16/855,587, Nonfinal Office Action, Nov. 20, 2020.
U.S. Appl. No. 16/855,587, Final Office Action, Apr. 28, 2021.
U.S. Appl. No. 16/855,587, Nonfinal Office Action, Sep. 23, 2021.
U.S. Appl. No. 16/855,587, Final Office Action, Jan. 21, 2022.
U.S. Appl. No. 16/855,587, Notice of Allowance, May 6, 2022.
Extended European Search Report for Application No. 21792375.4, dated Mar. 18, 2024.
Vorwerk presents RFID "Smart floor" at the CeBIT!, pp. 1-4. Retreieved from the internet at: <URL:http://www.vorwerk-carpet.com/sc/vorwerk/img/Pressetext/>Vorwerk_smart%20floor%20underlay_2006_engl.pdf> [retrieved on Dec. 10, 2009].

* cited by examiner

EASILY ATTACHABLE RFID TAG AND METHOD OF MAKING THE SAME

CROSS-REFERENCE TO RELATED APPLICATIONS

This application is a continuation of and claims the benefit of the filing date of U.S. patent application Ser. No. 16/855,578, filed Apr. 22, 2020 and entitled "EASILY ATTACHABLE RFID TAG AND METHOD OF MAKING THE SAME," which claims priority benefit of U.S. Provisional Application No. 62/837,138, filed Apr. 22, 2019. The disclosures of each of these related applications hereby incorporated by reference in their entirety.

FIELD OF TECHNOLOGY

The present disclosure generally relates to inventory tracking and management systems, and, more particularly, to radio frequency identification ("RFID") tags or labels used in an RFID-based inventory tracking and management system.

DESCRIPTION OF THE RELATED ART

Storage facilities, such as warehouses, house numerous and various products until those products are needed in a manufacturing process, need to be shipped to a customer, etc. Products in storage facilities may sit in the storage facilities for varying amounts of time depending on the need for those products or the shelf life of the product. Once a product is needed, a storage facility worker must generally either manually locate the product, or look up where the particular product was placed when it was first stored, using a computer or some other device. The worker may then use a delivery or transport vehicle to pick up the particular product and drop off the particular product at a desired location within the storage facility, such as on a manufacturing line, a truck for delivery, at a loading bay, etc.

As the worker travels around the storage facility with the delivery or transport vehicle, either transporting a product to a new location or going to pick up a product that needs to be moved to a new location, the worker must generally rely on visual indicators, or markings, disposed on various surfaces to determine where they are, and where products are located, within the storage facility. However, as is common in storage facilities, such visual indicators may be obstructed, dirty, torn, placed 20 to 40 feet in the air, or otherwise not easily visible to the worker as they travel around the storage facility. Further, even if the visual indicators are not obstructed, the workers field of view is regularly obstructed by the delivery or transport vehicle (e.g., forklift) they are driving or the products carried by the delivery or transport vehicle. Additionally, it is entirely possible that the visual indicators that are visible poorly communicate the particular location within the storage facility they are trying to designate. In other cases, the driver simply may not pay attention and miss the visual indicator. For example, the visual indicator can be placed between two shelves, or bays, in a manner that makes it difficult to discern which particular shelf or location the particular visual indicator is attempting to designate. As a result, workers traveling around the storage facility must generally rely on their memory or a visual indicator that may not be universally known to designate a particular location or area within the storage facility.

Moreover, the products housed in storage facilities are shuffled and moved around in order to accommodate other products, for cleaning purposes, or for any other reason that may necessitate moving a product from one location to another. It is possible that, during relocation of the product, two products become swapped or a product is misplaced or "lost" within the warehouse. The inadvertent misplacement of a particular product often goes undocumented because the misplacement of the product happens without the knowledge of the storage facility worker or simply due to human error. Moreover, storage facility workers may inadvertently take the wrong product and place it on a truck for delivery. Many factors may contribute to barcode scanning errors, such as mislabeled products, unclear marking of storage areas, relocated products whose new location was not updated in an inventory management system, or simply human error. Therefore, manually tracking and continuously updating the location of products as they are moved within a storage facility becomes a tedious and time-consuming task that is error prone. Such errors lead to incorrect products, or out of date products, being used during manufacturing and/or being shipped to customers and the inability to locate products resulting in shipping delays, costing money to the storage facility and potentially hazardous situations in the case of food products, pharmaceuticals, etc.

Additionally, moving products within the warehouse to a manufacturing line may experience the same or similar issued described above with respect to placing and/or moving products within the warehouse. For example, if a driver fails to scan the barcode disposed on the product, the driver may deliver the product to the wrong manufacturing line and/or the driver may deliver the wrong product to the manufacturing line. In either situation, the entire manufacturing line may be shut down costing countless dollars. In manufacturing lines processing food products or pharmaceuticals, the incorrectly delivered product may result in far more devastating issues than lost dollars.

A known method that attempts to mitigate the inherent issues with individuals manually tracking and continuously updating the location of products involves manually scanning a barcode disposed on a product and updating the location of the product using a barcode scanner. In such methods, as the product is relocated within the storage facility or placed on a truck for delivery at a loading bay, an individual was required to manually scan the barcode disposed on the product using the barcode scanner, and then update an inventory database with the new location of the product. However, such a system is not without its problem. For example, individuals working in a facility may not immediately scan the barcode disposed on a product being moved nor update the inventory database with the new location of the product in a timely manner resulting in an incorrect location being stored within the inventory database. Many factors may contribute to the delay in updating the product location. For example, little to no downtime time between moving products within the storage facility and/or general human error, such as the inability to remember, or incorrectly remembering, where certain products were placed; manually entering an incorrect location for the moved product; simply choosing not to update the inventory database with the new product location. As such, this time-consuming and error prone methodology may result in workflow inefficiencies, misplaced products, and numerous dollars lost as a result of expired and/or lost product. Alternatively, in the case of moving product(s) to a manufacturing line, the entire manufacturing line may be completely shut down as a result of delivering the wrong product(s).

In response to the inherent issues associated with manually scanning barcodes on products and updating the location of the moved product using the barcode scanner, another known method involves using a network of scanners to read and detect RFID tags disposed at various locations within the storage facility and on products. Such systems generally include a network of scanners disposed high above the floor (e.g., ceiling) allowing for the greatest amount of coverage with the least amount of scanner. However, these systems have been used with very little success because of signal interference caused by various structures and products disposed between the RFID tags and scanners as a result of the distance between the RFID tags and the scanners. This is problematic because the signal interference reduces the accuracy of the readings and, ultimately, the efficacy of the system. An example of such a system can be found in U.S. Pat. No. 8,690,057.

In view of the aforementioned difficulties experienced by known inventory tracking systems and methods, there have been attempts to detect where a forklift, or other movable device, is located within the storage facility at any given moment by placing RFID tags on the floor of the storage facility. However, known methods of placing RFID tags on floors often require drilling into the floor, or otherwise defacing the floor, so that the RFID tag may be placed disposed in the floor and then covered with an epoxy. Such heavy construction required to place the RFID tag on the floor disadvantageously requires considerable work to add, move, and/or replace the RFID tag around the storage facility and permanently defaces the storage facility floor. Other known methods of securing the RFID tag to the floor of the storage facility may avoid the need for heavy construction, but are plagued with other problem. Simply placing known RFID tags on the floor of the storage facility can detune the RFID tag. In other words, the floor of the storage facility may prevent, or otherwise inhibit, the placed RFID tag from receiving an interrogation signal from and/or transmitting an interrogation response signal to an interrogator, or RFID reader. A know remedy to mitigate detuning involves attaching a thick buffer layer, or several thick buffer layers, to the RFID tag to create a barrier between the RFID tag and that floor. However, this technique often requires the buffer layer, or several buffer layers, to be so thick that a forklift, or other movable device, cannot readily drive over the RFID tag placed on the floor, or when a pallet or other object on the forklift moves over the RFID tag, it may displace the RFID tag.

SUMMARY

The disclosed location designation RFID tag may be easily and non-invasively placed and relocated on a floor of a storage facility in a manner that mitigates, and likely resolves, the issues experienced by known RFID tags when placed on a floor. Utilizing an inlay having a long, thin antenna, reduces the overall thickness of the location designation RFID tag, which allows layers to be disposed on the inlay that include a sufficient thickness to improve durability, mitigate detuning, and allow movable devices to readily pass over the location designation RFID tag. In addition to using adequately thick first and second layers, the long length of the antenna allows the location designation RFID tag to be easily read and detected by a reader on a moving forklift thereby further strengthening the communication connection between the location designation RFID tag and the reader. An adhesive applied to the layer allows the location designation RFID tag to be non-invasively placed and relocated by almost anyone working in the facility without the need for defacing the floor. Finally, an easily visible designation may be disposed on surface and encoded on the inlay that assists with identifying where the location designation RFID tag belongs within the storage facility and with identifying where an individual is located within the storage facility.

In one aspect, a location designation radio frequency identification (RFID) tag for use in a facility includes an inlay, a first layer disposed on a first side of the inlay, and a second layer disposed on a second side of the inlay. The inlay includes an antenna, an integrated circuit, and a substrate. The antenna and the integrated circuit are disposed on the substrate. The first layer disposed on a first side of the inlay has a first thickness and the second layer disposed on the second side of the inlay has a second thickness that is different from the first thickness.

In a further aspect, a method of manufacturing a location designation RFID tag for use in a facility includes disposing a set of inlays on a carrier sheet. Each inlay of the set of inlays has an antenna conductively coupled to a radio frequency identification (RFID) chip. The method also includes attaching a set of first layers disposed on a first sheet onto a first side of the carrier sheet such that each first layer in the set of first layers substantially covers a first side of each inlay in the set of inlays. Each first layer in the set of first layers has a first thickness. The method also includes attaching a set of second layers disposed on a second sheet onto a second side of the carrier sheet such that each second layer of the set of second layers substantially covers a second side of each inlay in the set of inlays. The second side of each inlay in the set of inlays is opposite the first side of each inlay in the set of inlays. Each second layer in the set of second layers has a second thickness that is different from the first thickness.

DETAILED DESCRIPTION

Figure 1:
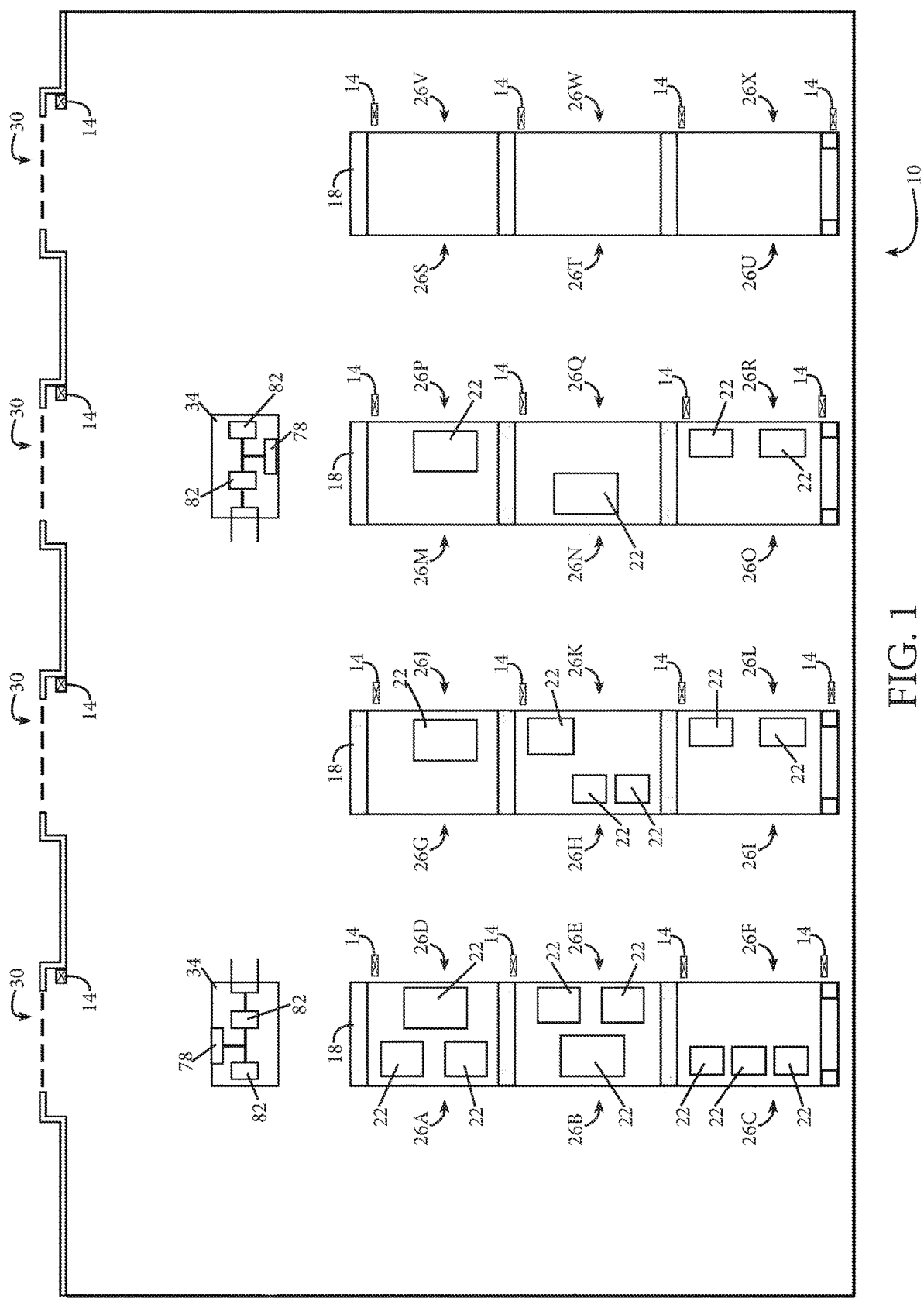
FIG. 1 is a top view of an example storage and shipping environment in which an example RFID tag is disposed.

FIG. 1 depicts a top view of an example storage and shipping environment 10 (e.g., a warehouse, storage facility) in which a location designation RFID tag 14 is disposed. The location designation RFID tag 14 may be used in a RFID based inventory tracking system to designate various locations where products may be placed for storage, shipment to a customer or another warehouse, or temporary storage used prior to a manufacturing process.

As illustrated in FIG. 1, the storage and shipping environment 10 includes a series of storage shelves 18, upon which various different products 22 may be stored for a period of time before use in a manufacturing process or being shipped to a customer. Each of the shelves 18 includes various bays 26 therein, which indicate portions of the shelves 18. As is typical in a warehouse environment, each bay 26 (labeled as bays 26A-26X in FIG. 1) may be labeled, or designated, with a unique identifier number within the context of the storage environment 10 using, for example, the location designation RFID tag 14. Each shelf 18 may be double-sided, for example, so that there is a bay 26 on either side of each shelf 18. Likewise, the storage and shipping environment 10 includes a series or shipping portals, or loading bays, 30 that may be, for example, associated with loading bays at which trucks park to drop off or accept delivery of the products 22 within the environment 10. Still further, the storage and shipping environment 10 includes various movable devices or forklifts 34 (or other delivery vehicles) which are used to place various ones of the products 22 on the shelves 18 in various ones of the bays 26 for storage; to move products 22 around within the shelves 18, if desired; to take products off the shelves 18 and deliver those products to one of the loading bays to be placed on a truck or other delivery vehicle, etc. Likewise, the forklifts 34 may pick up new products or materials from the loading bays (or from trucks at the loading bays) and place the new products or materials at any of the various bays 26 of shelves 18 for storage and later use. The forklifts 34 can use an RFID reader to read and detect location designation RFID tags 14 placed around the environment 10 to determine whether the forklift operator is at the correct shelf or correct bay depending on the product 22 the forklift operator intends to pick up.

As is known, in a busy and large storage facility, it is difficult to track the locations at which various different materials or products 22 are placed in a manner that makes it easy to find those products when needed, such as when needed in a manufacturing process, when these products need to be shipped to a customer, etc. Moreover, it is difficult to ensure the busy and large storage facility is using the first in, first out ("FIFO") inventory method. Thus, an RFID based tracking system, such as, for example, the one described in U.S. patent application Ser. No. 16/370,742 filed Mar. 29, 2019, titled "RFID-Based Inventory Tracking and Management System," which is incorporated herein by reference, can be used to enable automatic recognition of, and tracking of the various products 18 as they are placed in various bays of the shelves, as these products 22 are loaded onto delivery trucks at the loading bays. Additional information regarding the inventory tracking system may be found in the U.S. patent application Ser. No. 16/370,742 filed Mar. 29, 2019, titled "RFID-Based Inventory Tracking and Management System."

In addition to providing an operator with the ability to locate products 22 within a facility much faster, the location designation RFID tags 14 may be used by a detection system to automatically record the location where the particular product 22 was placed within the facility. For example, as the forklift operator drives from one area in the facility to another area in the facility with the product 22, the RFID based tracking system discussed above may use the location designation RFID tags 14 to automatically detect and record the location, or shelf 18, where the forklift operator placed the product 22. Additionally, depending on the placement of the location designation RFID tags 14, the RFID based tracking system may use the location designation RFID tags 14 to automatically record the particular bay 26 of the shelf 18 where the forklift operator placed the product 22. In particular, as the forklift operator drives the forklift 34 from one area to another area in the facility, an antenna mounted on the forklift 34 transmits an interrogation signal in the direction of travel of the forklift 34, for example, to detect any location designation RFID tags disposed in the direction of travel of the forklift 34. Using the antenna, an RFID reader detects the location designation RFID tags 14 and sends the location of the last detected location designation RFID tag 14 prior to dropping off the product 22 to the RFID based tracking system to automatically detect and store the location that the product 22 was placed.

Figure 2:
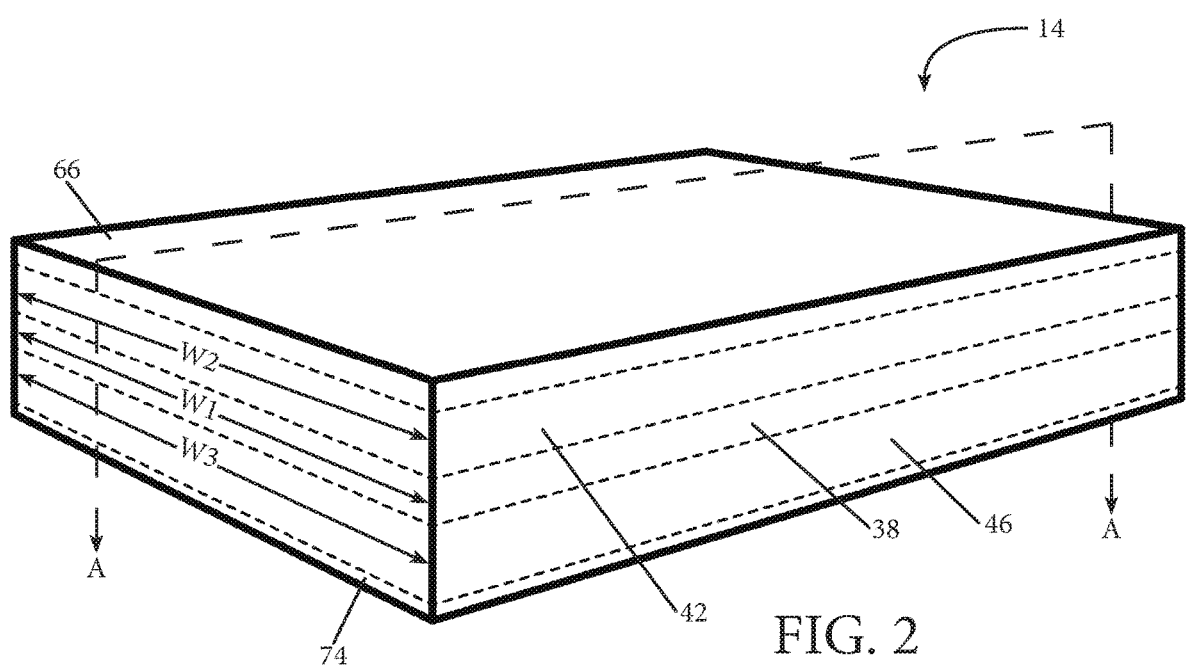
FIG. 2 is a perspective view of an example location designation RFID tag disposed in the storage and shipping environment of FIG. 1.
Figure 3:
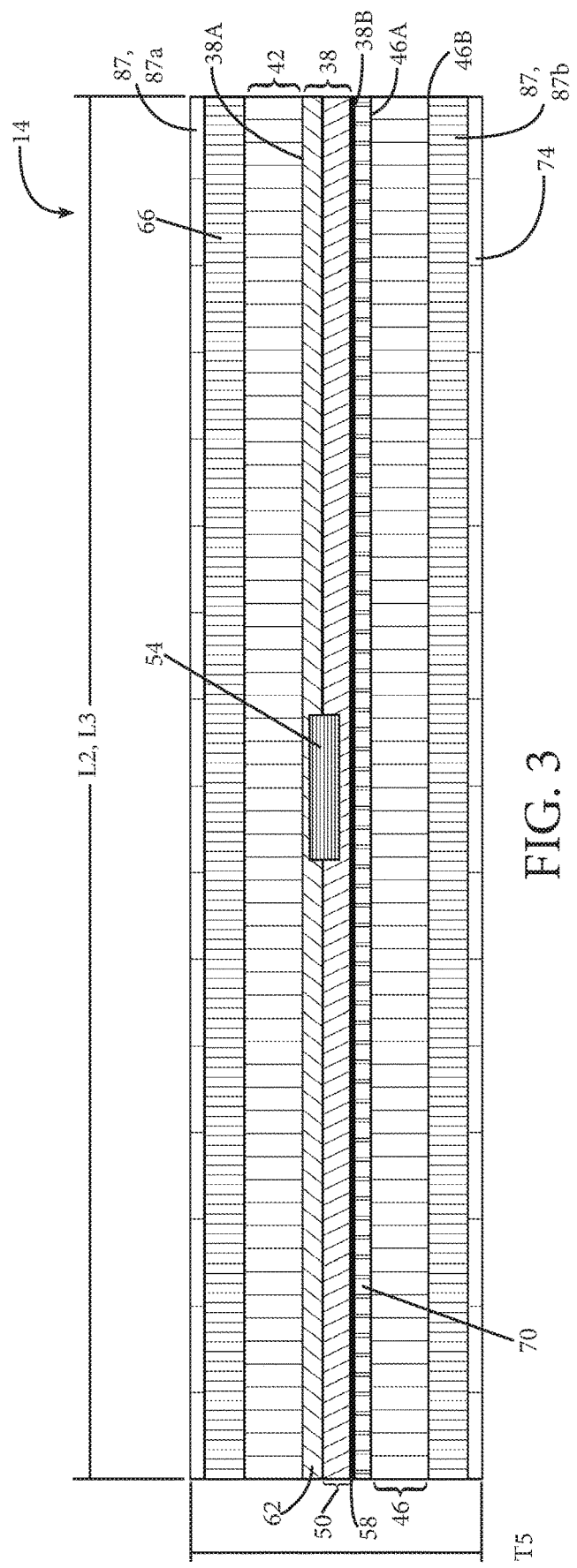
FIG. 3 is a cross-sectional view of the location designation RFID tag of FIG. 2 along the line A-A.
Figure 4:
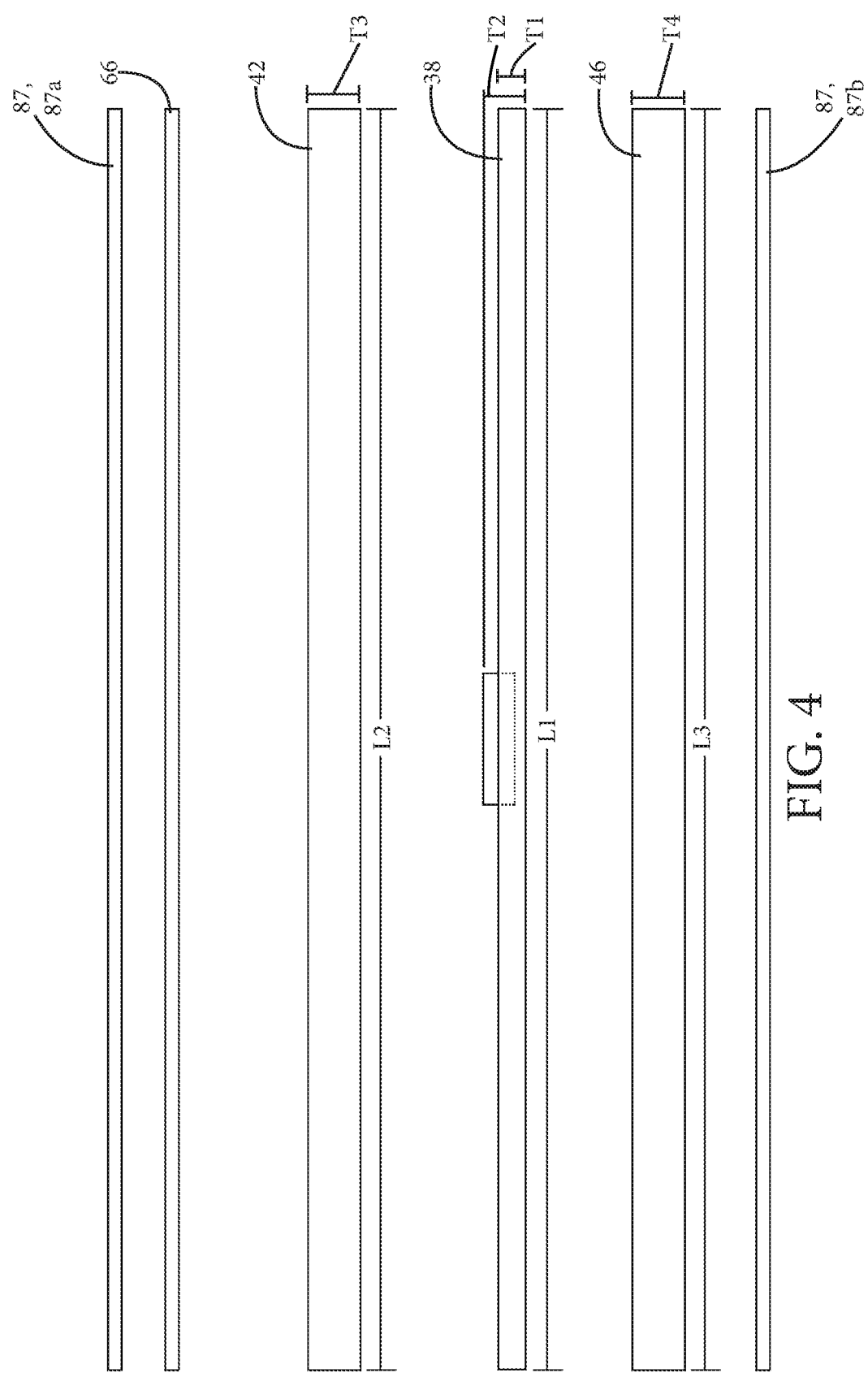
FIG. 4 is an exploded side view of the location designation RFID tag of FIG. 2.
Figure 5:
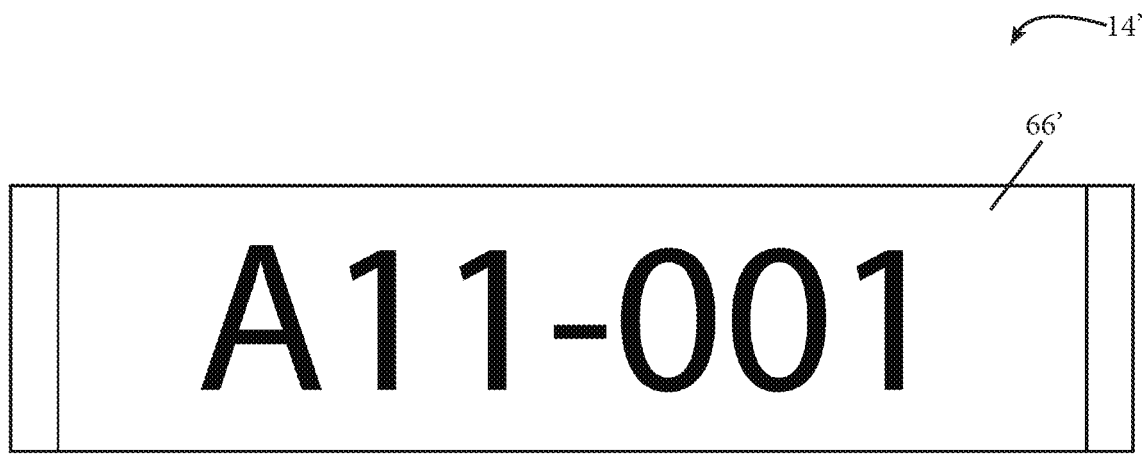
FIG. 5 is a top view of the location designation RFID tag of FIG. 2, including information about the location designation RFID tag disposed thereon.
Figure 5:
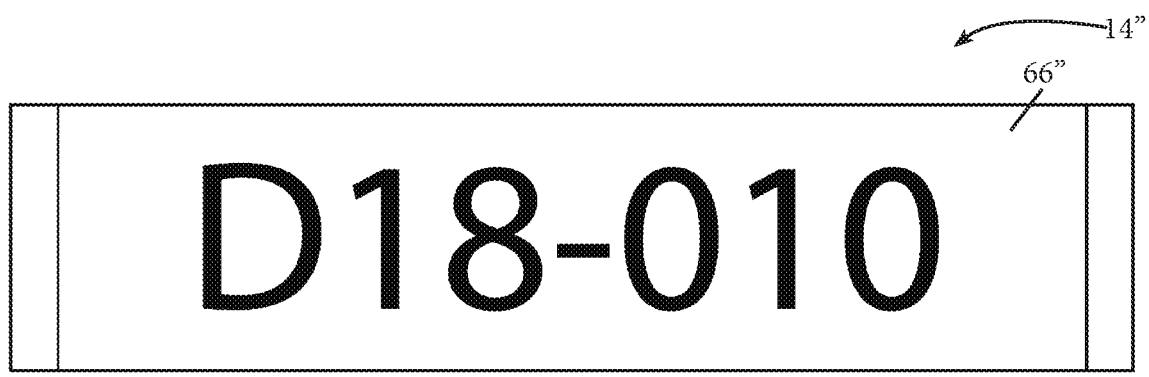

FIGS. 2-5 illustrates a location designation RFID tag 14 for use in the inventory tracking system described above. In particular, FIG. 2 illustrates a perspective view of a single location designation RFID tag 14; FIG. 3 illustrates a cross-sectional view of the location designation RFID tag 14 of FIG. 2 along line A-A; FIG. 4 illustrates an exploded view of the location designation RFID tag 14 of FIG. 2; and FIG. 5 illustrates a top view of the location designation RFID tag 14 of FIG. 2. The location designation RFID tag 14 may be non-invasively placed anywhere in the environment 10 to mark, or designate, a particular location within the environment 10 because of an adhesive disposed on a side of the location designation RFID tag 14. In other words, because of the adhesive, the location designation RFID tag 14 may be secured to a surface without defacing the surface. For example, the location designation RFID tag 14 can be placed on the floor of the environment at or near a shelf 18, on the floor of the environment at or near a particular bay 26A-X of a shelf 18, or on the floor of the environment at or near a particular loading bay 30 to designate that location as a point of interest within the environment.

As best illustrated in FIGS. 3 and 4, the location designation RFID tag 14 generally includes an inlay 38, a first layer 42 adhered to a first side 38A of the inlay 38, and a second layer 46 adhered to a second side 38B of the inlay 38. In particular, the inlay 38 includes an antenna 50, an RFID chip, or integrated circuit, 54 conductively bonded to the antenna 50, and a substrate 58 on which the antenna 50 and the RFID chip 54 are disposed. The conductive bond communicatively couples the antenna 50 and the RFID chip 54 such that the antenna 50 receives the interrogation signal and power therewith sent by an interrogator, or reader, 78 and transmits the received interrogation signal and power to the RFID chip 54. In turn, the antenna 50 receives an interrogation response signal from the RFID chip 54 and transmits the received interrogation response signal to the interrogator 78. As discussed above in relation to FIG. 1, the interrogator 78 that reads and detects various location designation RFID tags 14 may be place on the forklift 34. Because the forklift 34 is often moving quickly throughout the environment, it is desirable to ensure a strong communication connection between the interrogator and the location designation RFID tags 14. It has been found that inlays 38 having a length L1 (FIG. 4) and a width W1 (FIG. 2) that create a large surface area for the interrogator 78 to detect may help facilitate the strong communication connection. For example, the length L1 (FIG. 4) of the inlay 38 can be between 1 and 10 inches (25.4 to 254 mm) and the width W1 (FIG. 2) of the inlay 28 can be between 0.10 and 10 inches (2.54 and 254 mm) and, in particular, the length L1 (FIG. 4) can be between 3 and 4 inches (76.2 and 101.6 mm) and the width W1 (FIG. 2) can be between 0.30 and 1 inches (7.62 and 25.4 mm). In other examples, the length L1 (FIG. 4) of the inlay 38 can be approximately 3.25 inches (82.55 mm), 3.55 inches (90 mm), 3.87 inches (98.18 mm), etc., and the width W1 (FIG. 2) of the inlay 38 can be approximately 0.48 inches (12.31 mm), 0.50 inches (12.70 mm), 0.75 inches (19 mm), etc.

Examples of antennas 50 that can provide a sufficiently strong communication connection between the location designation RFID tag 14 and the interrogator include a squiggle antenna, a squiglette antenna, a squiglette-E antenna, a short squiggle antenna, an express squiggle antenna, or a squig antenna. In particular, the antenna 50 can be an Alien Squiggle version 9740 or 9840, an Alien Document inlay version 9841, an Alien Garment Tag Inlay versions 9827, an AD-661r6 UHF RFID inlay, or an AD-661r6-P UHF RFID inlay. The RFID chip 54 can, for example, be a Higgs™ 9 RFID tag IC, a Higgs™-EC RFID tag IC, an Impinj Monza r6, or an Impinj Monza r6-P.

Moreover, the inlay 38 may also have an antenna thickness T1 (FIG. 4) that corresponds to the distance from the bottom surface of the inlay 38 to the top surface of antenna 50 and an RFID chip thickness T2 that corresponds to the distance from the bottom surface of the inlay 38 to the top surface of the RFID chip 54. For example, the antenna thickness T1 (FIG. 4) can be between 0.0039 to 0.0197 inches (0.10 to 0.50 mm) and the RFID chip thickness T2 (FIG. 4) can be between 0.010 to 0.0394 inches (0.254 to 1 mm), and, more particularly the antenna thickness T1 (FIG. 4) can be approximately 0.0063 inches (0.16 mm) and the RFID chip thickness T2 (FIG. 4) can be approximately 0.014 inches (0.36 mm).

As illustrated in FIGS. 3 and 4, the location designation RFID tag 14 has the first layer 42 disposed on the first side 38A of the inlay 38 and the second layer 46 disposed on the second side 38B of the inlay 38. In particular, the first layer 42 is adhered to the first side 38A of the inlay 38 using a first adhesive 62 such as, for example, a heat activated adhesive, an epoxy, a pressure sensitive adhesive, or any other mechanical means. So configured, the first layer 42 may help reduce, or absorb, impact as the forklift 34 drives over the location designation RFID tag 14 thereby protecting the underlying inlay 38 and potentially extending the useful life of the location designation RFID tag 14. Accordingly, it is desirable that the first layer 42 be made of a material strong enough to withstand the weight of the forklift 34, or other heavy machinery, driving over the location designation RFID tag 14 yet conducive enough to allow the interrogator 78 to establish a communication connection strong enough to properly transmit the interrogation signal to and receive the interrogation response signal from the location designation RFID tag 14. Such material properties can be achieved by forming the first layer 42 from, for example, a durable thermoplastic material such as a semi-rigid polyester, a rigid polyvinyl chloride (PVC), a polycarbonate, a polyethylene, or a polypropylene.

Further, the first layer 42 includes a length L2 (FIG. 3) and a width W2 (FIG. 2) that extend past, or encapsulate, the inlay 38 thereby providing additional protection of the inlay 38. For example, the length L2 (FIG. 3) of the first layer 42 can be between 2 and 10 inches (50.8 and 254 mm), 3 to 8 inches (76.2 to 203.2 mm), 4 to 7 inches (101.6 to 177.8 mm), 5 to 10 inches (127 to 254 mm), 6 to 9 inches (152.4 to 228.6 mm), 4 to 8 inches (101.6 to 203.2 mm), and the width W2 (FIG. 2) of the first layer 42 can be between 0.5 and 5 inches (12.7 and 127 mm), 1 to 3 inches (25.4 to 127 mm), 2 to 5 inches (50.8 to 127 mm), 3 to 4 inches (76.2 to 101.6 mm). In particular, the length L2 (FIG. 3) of the first layer 42 may be approximately 4 inches (101.6 mm) and the width W2 (FIG. 2) of the first layer 42 may be approximately 1 inch (25.4 mm).

As discussed above, to avoid disposing a location designation tag in a hole drilled in the floor of a storage facility, location designation tags were mechanically secured to the floor (e.g., using a nut and bolt, a screw, or other fastener), but, disadvantageously, were often too thick to be driven over by a forklift, or other movable device. Unlike known location designation tags, it is desirable that the first layer 42 of the claimed location designation RFID tag 14 includes a thickness T3 such that the forklift 34, or other heavy machinery, moving through the environment may drive over the location designation RFID tag 14 with minimal, or without any, disturbances. So configured, the thickness T3 of the first layer 46 can, for example, be between approximately 0.10 and 1 inches (2.54 and 25.4 mm), between 0.10 and 0.30 inches (2.54 and 7.62 mm), and, more particularly, the thickness T3 of the first layer 42 can be approximately 0.1095 inches (2.78 mm).

The second layer 46, illustrated in FIGS. 3 and 4, is similar to the first layer 42 in that the second layer 46 is adhered to the inlay 38 using a second adhesive 70, but, unlike the first layer 42, the second layer 46 is adhered to the second side 38B of the inlay 38. Because the second layer 46 is disposed between the floor and the inlay 38 In particular, a first side 46A of the second layer 46 is adhered to the second side 38B of the inlay 38 using the second adhesive 70 such as, for example, a heat activated adhesive, an epoxy, or a pressure sensitive adhesive. So configured, the second layer 46 may aid the first layer 42 in reducing, or absorbing, impact as the forklift 34 drives over the location designation RFID tag 14. Accordingly, it is desirable that the second layer 46 be made of a material that is strong enough to withstand the weight of the forklift 34, or other heavy machinery, driving over the location designation RFID tag 14. Such material properties may be achieved by forming the second layer 46 from, for example, a durable thermoplastic material such as a semi-rigid polyester, a rigid polyvinyl chloride (PVC), a polycarbonate, a polyethylene, or a polypropylene.

Further, the second layer 46 includes a length L3 (FIG. 3) and a width W3 (FIG. 2) that extend past, or encapsulate, the inlay 38. In particular, the length L3 (FIG. 3) and width W3 (FIG. 2) of the second layer 46 may be substantially equal to the length L2 (FIG. 2) and the width W2 (FIG. 2) of the first layer 42. In other words, the length L3 (FIG. 3) of the second layer 46, for example, can be between 2 and 10 inches (50.8 and 254 mm), 3 to 8 inches (76.2 to 203.2 mm), 4 to 7 inches (101.6 to 177.8 mm), 5 to 10 inches (127 to 254 mm), 6 to 9 inches (152.4 to 228.6 mm), 4 to 8 inches (101.6 to 203.2 mm), and the width W3 (FIG. 2) of the second layer 46 can be between 0.5 and 5 inches (12.7 and 127 mm), 1 to 3 inches (25.4 to 127 mm), 2 to 5 inches (50.8 to 127 mm), 3 to 4 inches (76.2 to 101.6 mm). More particularly, the length L3 (FIG. 3) of the second layer 46 may be approximately 4 inches (101.6 mm) and the width W3 of the second layer 46 may be approximately 1 inch (25.4 mm). However, in some examples, the length L3 (FIG. 3) and the width W3 (FIG. 2) of the second layer 46 can be different than the length L2 (FIG. 3) and the width W2 (FIG. 2) of the first layer 42.

Known RFID tags have been used with limited success when placed on a floor (e.g., a concrete floor) of a storage facility because the floor may "detune" the RFID tag, which undesirably inhibits an interrogator from establishing a strong communication connection with the RFID tag disposed on the floor. Disposing the second layer 46 on the second side 38B of the inlay 38 (i.e., between the floor of the environment 10 and the inlay 38) advantageously creates a barrier between the inlay 38 and the floor, which may prevent, or at least mitigate, detuning of the location designation RFID tag 14. It is therefore important that a thickness T4 of the second layer 46 creates a sufficient barrier between the floor and the inlay 38 to prevent, or at least mitigate, detuning of the location designation RFID tag 14. It has been found that, for example, the thickness T4 (FIG. 4) of the second layer 46 can be between 0.10 and 1 inches (2.54 and 25.4 mm), between 0.10 and 0.30 inches (2.54 and 7.62 mm), and, more particularly, the thickness T4 of the second layer 46 can be approximately 0.1095 inches (2.78 mm).

Moreover, known location designation tags require defacing the floor of the storage facility by either creating a hole in the floor large enough to receive the location designation tag or securing the location designation tags to the floor using a mechanical fastener (e.g., using a nut and bolt, a screw, or other fastener). Unlike known location designation tags, it is desirable that the location designation RFID tag 14 be applied to the floor of the environment 10 in a non-invasive manner. It is therefore important that the second layer 46 includes an adhesive capable of releasably attaching the location designation RFID tag 14 to the floor of the environment 10. Accordingly, as illustrated in FIG. 3, a second side 46B of the second layer 46 includes a third adhesive 74 such as, for example, cyanoacrylates, structural acrylic adhesives, or epoxy adhesives, disposed thereon. The third adhesive 74 may be a semi-permanent adhesive that acts similar to a permanent adhesive in that the third adhesive 74 makes it difficult for the location designation RFID tag 14 to be removed from the floor accidently. However, the third adhesive 74 may be releasable enough that the location designation RFID tag 14 may be removed from the floor using a scraper and then reapplied using a spray adhesive. While the third adhesive 74 has been discussed as releasably attaching the location designation RFID tag 14 to the floor of the environment 10, in other examples, the third adhesive 74 can permanently attach the location designation RFID tag 14 to the floor of the environment 10.

Additionally, as illustrated in FIG. 5, the location designation RFID tag 14 includes a printing layer 66 that may have words, letters, phrases, and/or numbers that visually convey information about the particular location designation RFID 14 to a user. It is desirable that a location designation RFID tag 14 be able to visually convey information about the particular location designation RFID tag 14 because doing so may aid in the placement of the location designation RFID tags 14 around the environment 10 and as well as aid a forklift driver in determining where they are in the environment 10. The printing layer 66 may be disposed on the first layer 42 using a similar attachment technique as discussed above with regard to adhering the first layer 42 or second layers 46 to the inlay 38. For example, the printing layer 66 can be adhered to the first layer 42 using a heat activated adhesive, an epoxy, or a pressure sensitive adhesive. The printing layer 66 may be between 0.001 and 0.010 inches (0.0254 to 0.254 mm) thick and, more particularly, may be approximately 0.003 inches thick (0.0762 mm). The printing layer 66 may also disguise the location designation RFID tag 14 such that the location designation RFID tag 14 blends in with the area surrounding the placed location designation RFID tag 14. For example, if the location designation RFID tag 14 is placed on a concrete floor, the printing layer 66 can be colored gray to help the location designation RFID tag 14 blend in with the floor. In other examples, the printing layer 66 may be the top surface of the first layer 42 provided that the first layer 42 is made of a material capable of being printed on.

After coupling the printing layer 66 to the first layer 42, the first layer 46 to the inlay 38, and the second layer 46 to the inlay 38 (i.e., once the location designation RFID tag 14 is assembled) the location designation RFID tag 14 has an overall thickness T5 (FIG. 3). In particular, the overall thickness T5 may vary depending on the RFID chip thickness T2, the thickness T3 of the first layer 42, and the thickness T4 of the second layer 46. However, it is desirable, for reasons discussed extensively above, that the RFID chip thickness T2, the thickness T3 of the first layer 42, and the thickness T4 of the second layer 46 be such that the overall thickness T5 allows for the forklift 34 to drive over the location designation RFID tag 14 with little to no disturbances. It has been found that, for example, the overall thickness T5 can be between 0.10 and 0.50 inches (2.54 and 12.7 mm), between 0.20 and 0.30 inches (5.08 and 7.62 mm) and more particularly approximately 0.236 inches (5.99 mm).

Additionally, forklifts 34 driving over location designation RFID tags 14 may leave tire marks or debris on the printing layer 66 making it difficult for an individual in the environment 10 to read and/or understand the visual indication on the printing layer 66. Similarly, a forklift operator with a tire of the forklift 34 resting on the location designation RFID tag 14 may unintentionally spin the tires in place (e.g., a burnout) thereby damaging, removing, loosening, and/or repositioning the location designation RFID tag 14. It is therefore desirable that the location designation RFID tag 14 includes a plurality of lamination layers 87 adhered to the first and second layers 42, 46 that may mitigate, and/or prevent, against such damage, removal, loosening, and/or repositioning. The plurality of lamination layers 87 may also provide protection against the elements such as water, dust, mold, etc. and chemical spills.

For example, as illustrated in FIG. 4, the plurality of lamination layers 87 can include a first lamination layer 87a adhered to the first layer 42 and a second lamination layer 87b adhered to the second layer 46. To adequately protect the location designation RFID tag 14, the first and second lamination layers 87a, 87b may extend past the first and second layers 42, 46 such that when the first and second lamination layers 87a, 87b are coupled to one another, the location designation RFID tag 14 is encapsulated by the plurality of lamination layers 87. So configured, an adhesive (not illustrated) may be disposed on at least one of the pluralities of lamination layers 87 instead of, or in addition to, the third adhesive 74 for attaching the laminated location designation RFID tag 14 to the floor of the environment 10. The plurality of lamination layers 87 can be, for example, a rigid polyester, vulcanized fiber, phenolic, polyester, malemine resin, an epoxy, or silicone. In other examples, the location designation RFID tag 14 can be laminated directly to the floor of the environment 10 using a single lamination later rather than a plurality of lamination layers 87.

After assembly, but prior to use, the location designation RFID tag 14 may be programmed, or encoded, so that the interrogator 78 may properly distinguish and/or identify one location designation RFID tag 14 from another location designation RFID tag 14. In particular, each location designation RFID tag 14 can be encoded with a unique identifier indicative of a particular shelf 18, or bay 26A-X of the shelf 18, using, for example, text encoding, hexadecimal encoding, or serialized global trade item number ("SGTIN"). Once the location designation RFID tags 14 have been encoded, it may not be possible to determine which unique identifier was encoded to which location designation RFID tag 14 without the use of an interrogator 78. It is therefore desirable that the printing layer 66 include words, letters, numbers, phrases, or any combination thereof, associated with the unique identifier printed, or otherwise disposed, thereon. So configured, the printing layer 66 may provide a visual indication of which unique identifier was encoded thereon and, ultimately, provide a visual indication of where the location designation RFID tag 14 is to be placed within the environment 10.

Turning back to FIG. 5, which illustrates the printing layer 66' of a first location designation RFID tag 14' and the printing layer 66" of a second location designation RFID tag 14". If, for example, a user would like to place the first location designation RFID tag 14" at bay "001" of shelf "A11," then the first location designation RFID tag 14' can be encoded to store that information on an electronic product code ("EPC") memory of the RFID chip 54. In turn, the printing layer 66' may have a first designation such as, "A11-001" printed, or otherwise deposited thereon to visually indicate to the user where the first location designation RFID tag 14" is to be placed without the use of an electronic device capable of reading and displaying the information stored in the EPC memory of the RFID chip 54. Similarly, if, for example, a user would like to place the second location designation RFID tag 14" at bay "010" of shelf "D18," then the second location designation RFID tag 14" can be encoded to store that information on the EPC memory of the RFID chip 54. In turn, the printing layer 66" may have a second designation such as, "D18-010" printed, or otherwise deposited thereon to visually indicate to the user where the second location designation RFID tag 14" is to be placed without the use of an electronic device capable of reading and displaying the information stored in the EPC memory of the RFID chip 54.

Once all of the desired location designation RFID tags 14 have been encoded and placed throughout the environment 10, the interrogator 78 disposed on the forklift 34 uses an antenna 82 disposed thereon to read and detect the information encoded on the location designation RFID tag 14 within range of the antenna 82. In particular, the interrogator 78 provides power to the antenna 82, which then sends the interrogation signal in the direction that the antenna 82 is facing. The interrogation signal transmits both power and a request signal to the antenna 50 of the location designation RFID tag 14, which transmits both the power and request signal to the RFID chip 54. In response to receiving the request signal, the RFID chip 54 queries the EPC memory for the encoded information stored thereon. In turn, the antenna 50 receives the encoded information from the RFID chip 54 and transmits the interrogation response signal including the encoded information to the antenna 82, which will ultimately transmit the interrogation response signal to the interrogator 78.

As a result of the issues experienced by known location designation tags discussed above, establishing a strong communication connection between an interrogator and an RFID tag disposed on the floor has been met with little success. While detuning is, among other factors, what may prevent establishing the strong communication connection, the orientation of an RFID tag relative to an interrogator plays an important role in establishing a strong communication connection. In particular the strength of the communication connection established between the interrogator 78 and the location designation RFID tag 14 depends on the direction at which a signal arrives relative to the plane at which the antenna 50, 82 is disposed. It is therefore important that the location designation RFID tag 14 not only utilize hardware components that provide the interrogator 78 with the largest feasible surface area to reach and detect, but also to orient the location designation RFID tags 14 in a manner that provides the strongest communication connection as the forklift 34 with the interrogator 78 travels throughout the environment 10. It has been determined that disposing the location designation RFID tag 14 on the floor of the environment 10 at an orientation that is perpendicular to the direction the direction of travel of the forklift 34 may establish a strong communication connection between the location designation RFID tag 14 and the interrogator 78 on the forklift.

Figure 6:
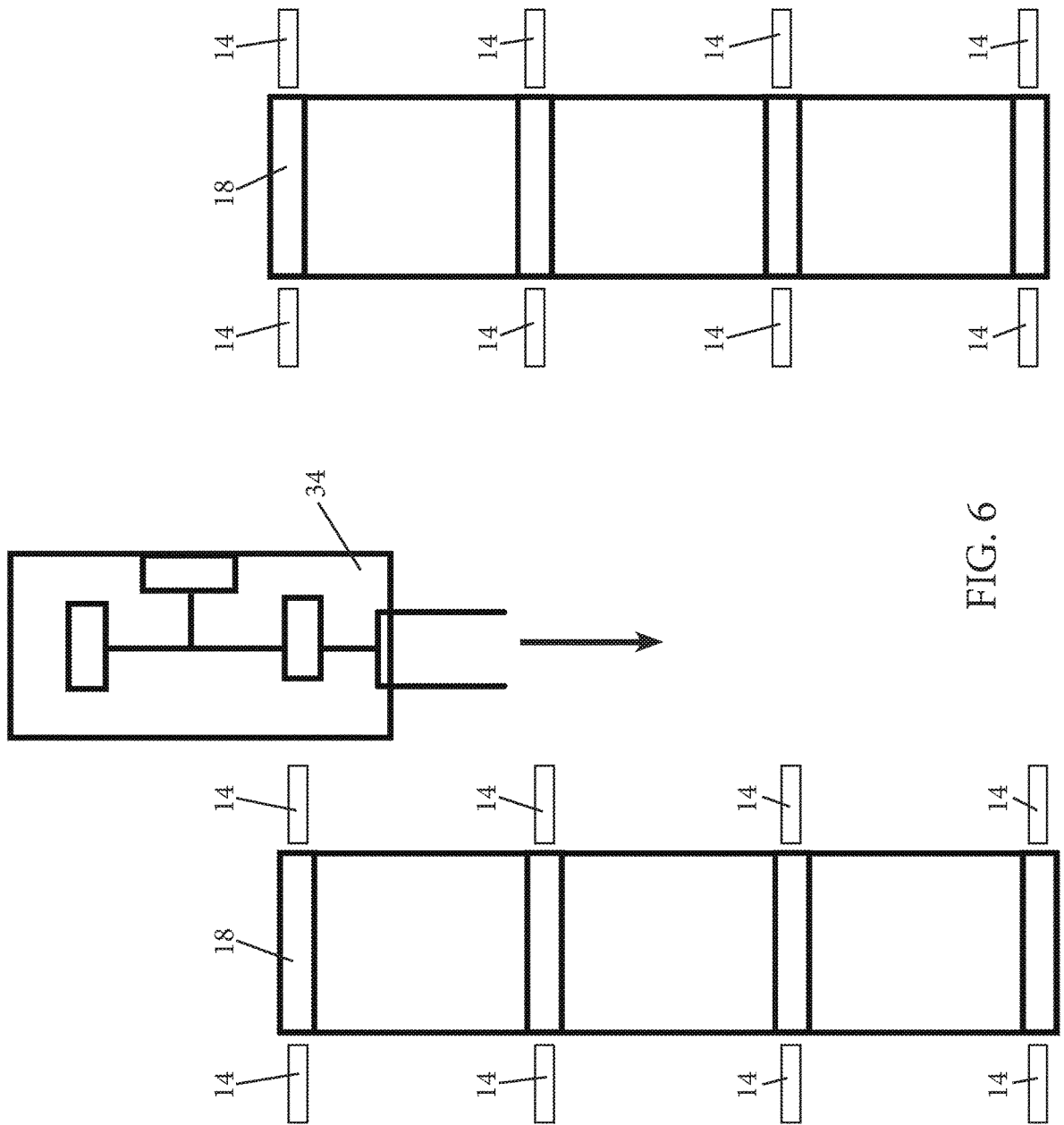
FIG. 6 is a top view of a plurality of shelves in a storage and shipping environment illustrating a movable device traveling and reading location designation RFID tags.

FIG. 6 illustrates one example location designation RFID tag placement scheme that can provide a strong communication connection between the location designation RFID tag 14 and the interrogator 78 based on the direction of travel of the forklift 34. In particular, several location designation RFID tags 14 are oriented relative to a direction of travel (indicated with an arrow) of the forklift 34 that may establish the strongest communication connection between the location designation RFID tag 14 and the interrogator 78 disposed on the forklift 34. In particular, the shelves 18 may be arranged within the environment so that the forklift 34 drives parallel to the shelves 18 as the forklift driver is travels to place or pick up a product 14. The antenna 82 may then be arranged on the forklift 34 so that a signal transmitted from the antenna 82 is transmitted in the direction of travel of the forklift 34. In turn, the location designation RFID tags 14 may be oriented on the floor of the environment 10 so they are perpendicular to the direction of travel of the forklift 34 and the signal transmission direction of the antenna 82. Because the location designation RFID tag 14 may not be symmetrical, some orientations of the location designation RFID tag 14 may provide a stronger communication connection than others. For example, the overall length of location designation RFID tag 14 is greater than an overall width of the location designation RFID tag 14. So configured, orienting the location designation RFID tag 14 so that the length of the of the location designation RFID tag 14 is perpendicular to the direction of travel of the forklift 34 provides the antenna 82 with the largest surface area of the location designation RFID tag 14 to read and detect. In particular, orienting the location designation RFID tag 14 in this manner ensures that the dimension of the antenna 50 of the inlay 38 having the largest surface area is perpendicular to the direction of signal transmission of the antenna 82 disposed on the forklift 34. As defined herein, substantially perpendicular may mean exactly 90° between the longest edge of the location designation RFID tag and the direction of signal transmission of the antenna 82 disposed on the forklift 34. However, substantially perpendicular may also mean between 45° and 90° between the longest edge of the location designation RFID tag and the direction of signal transmission of the antenna 82 disposed on the forklift 34; between 90° and 135° between the longest edge of the location designation RFID tag and the direction of signal transmission of the antenna 82 disposed on the forklift 34; and/or between 45° and 135° between the longest edge of the location designation RFID tag and the direction of signal transmission of the antenna 82 disposed on the forklift 34.

However, some location designation RFID tags 14 may have overall dimensions that do not mirror the dimensions of the inlay 38. In such examples, the printing layer 66 can have an orientation indicator disposed thereon that visually indicates the proper orientation of the location designation RFID tag 14 relative to the direction of travel of the moving device that includes the interrogator 78 and antenna 82. In other words, the orientation indicator may provide a visual guide to a user on how to place the location designation RFID tag 14 on the floor, or other surface, of the environment 10 such that a strong communication connection may be established between the interrogator 78 and the location designation RFID tag 14.

Moreover, because the environment 10 may several locations to be designated, or otherwise marked, several location designation RFID tags 14 may be placed in close proximity to one another. Such close placement of several location designation RFID tags 14, however, may cause the interrogator 78 to read and detect multiple location designation RFID tags 14 at once thereby preventing the interrogator 78 from "locking on" to a particular location designation RFID tag. It is therefore important the location designation RFID tags 14 be placed on the floor of the environment 10 with an adequate distance between each location designation RFID tag 14 so that the interrogator 78 reads one location designation RFID tag 14 at a time. It has been found that, for example, placing each location designation RFID tag 14 at least 12 inches apart from every other location designation RFID tag 14 allows the interrogator 78 to read and lock-on to one location designation RFID tag 14 at a time.

However, several location designation RFID tags 14 may be placed in close proximity to one another at a single location purposefully. For example, there may be locations within the environment 10 that have a considerable number of objects that may be between the interrogator 78 and location designation RFID tag 14 which may interfere with the communication connection between the interrogator 78 and the location designation RFID tag 14. As a result, several location designation RFID tags 14 may be placed in a group (e.g., 2, 3, 4, or 5) to designate a single location. Accordingly, each of the location designation RFID tags 14 placed in the group may be encoded with the same location but include a unique identifier to be able to easily identify each location designation RFID tag 14 in the group.

Figure 7:
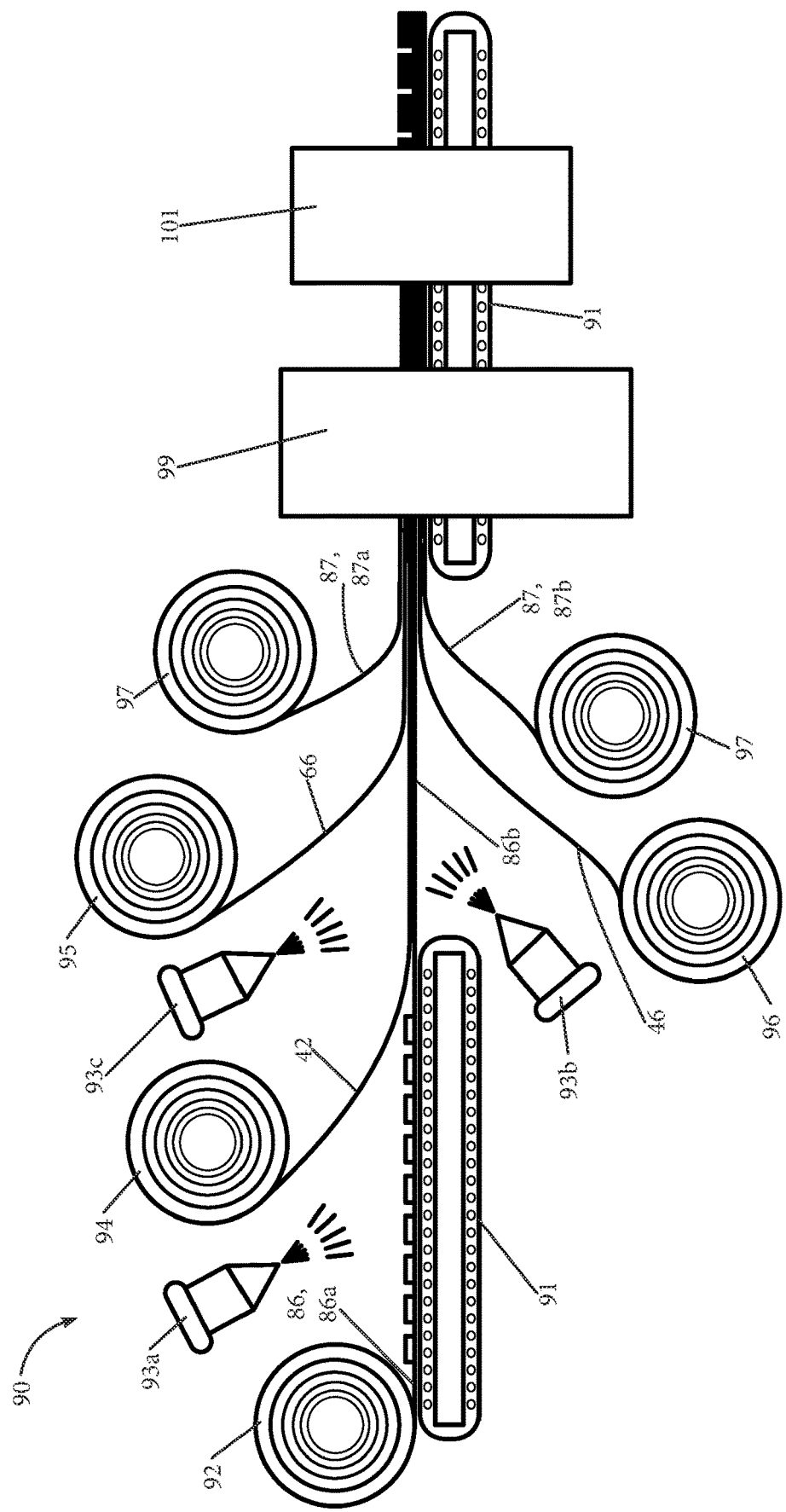
FIG. 7 is an example assembly line for producing the location designation RFID tag of FIG. 2.
Figure 8:
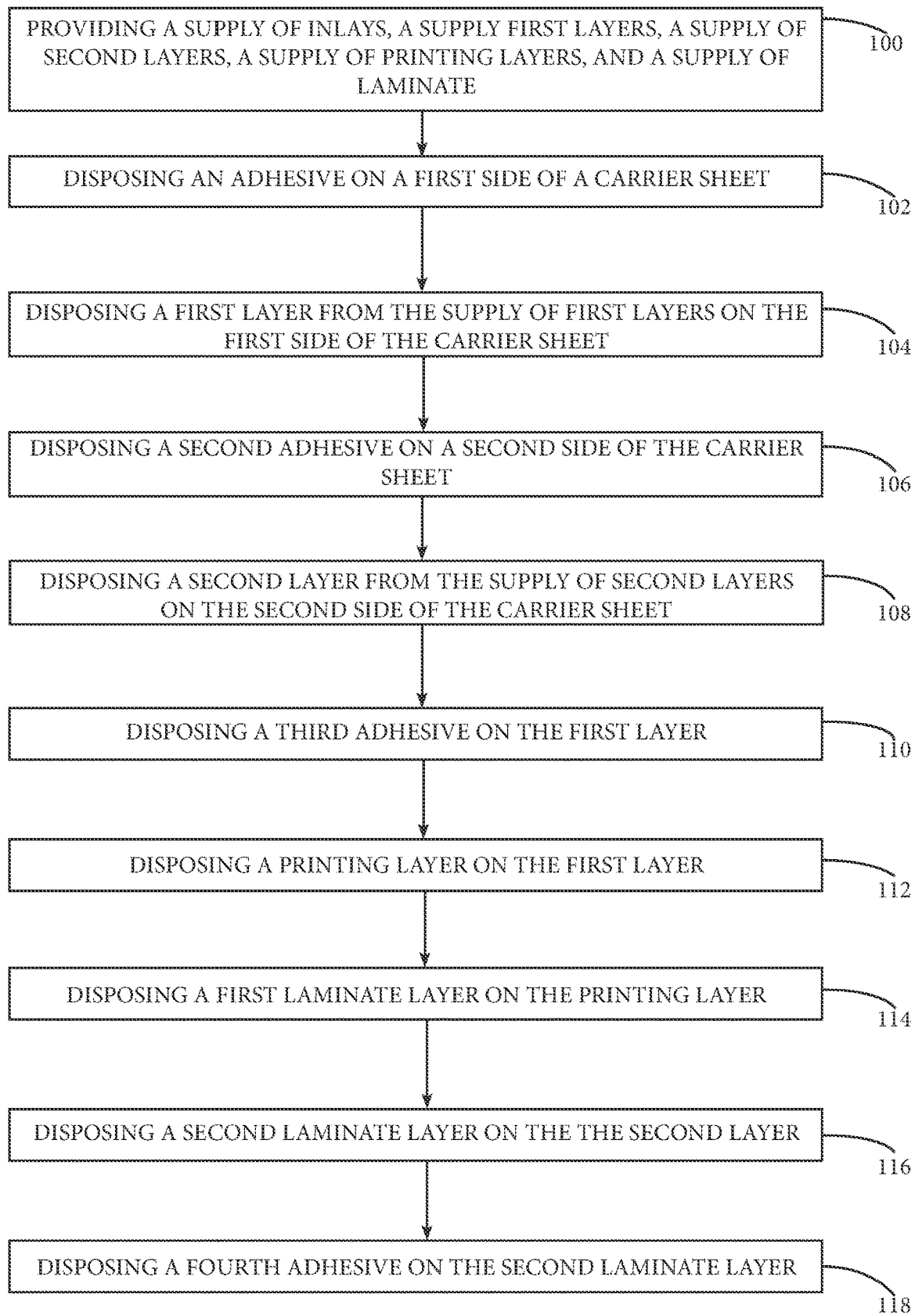
FIG. 8 is a flow chart of an example method of manufacturing the location designation RFID tag of FIG. 2.

FIGS. 7 and 8 illustrate methods of manufacturing the location designation RFID tag 14 of FIG. 2. In particular, FIG. 7 illustrates an assembly line 90 for mass producing the location designation RFID tag 14 and FIG. 8 illustrates a method of manufacturing the location designation RFID tags 14 of FIG. 2. As discussed above, known location designation tags were either placed in a clunky or oblong housing or constructed to withstand being placed in a floor and then coved with an epoxy. Assembly and preparation for such known RFID tags may require an involved manufacturing and assembly process. One manufacturing process is disclosed with reference to FIG. 7, but other processes can be used to manufacture the location designation RFID tag.

As illustrated in FIG. 7, the assembly line 90 for manufacturing the location designation RFID tag 14 generally includes a conveyor belt 91, or other transport mechanisms, a supply of inlays 38, a supply of the first layer 42, and a supply of the second layer 42. The supply of inlays 38 may be an inlay roll 92 that is disposed toward a beginning of the assembly line 90 and formed by disposing multiple inlays 38 on a carrier sheet 86 where each inlay 38 is disposed a fixed distance from every other inlay 38. The inlay roll 92 may be operably coupled to the conveyor belt 91 such that the inlay roll 92 unrolls under the force exerted thereon as the conveyor belt 91 moves forward thereby providing a continuous supply of the carrier sheet 86 with the inlays 38 disposed thereon. So configured the inlay roll 92 may be mounted, or otherwise secured, to a structure allowing the inlay roll 92 to continuously unroll in response to the conveyor belt moving. In some examples, however, the inlay roll 92 can be disposed within a container having an opening through which the carrier sheet 86 passes. The opening of the container can have a cover that allows the carrier sheet 86 to pass through while mitigation, or preventing, debris from entering the container.

The supply of first layers 42 may be a first layer roll 94 formed by disposing multiple first layers on a carrier sheet where each first layer 42 is disposed a fixed distance from every other first layer 42. The first layer roll 94 may be operably coupled to the conveyor belt 91 such the first layer roll 94 unrolls under the force exerted thereon as the as the conveyor belt 91 moves forward thereby providing a continuous stream of the carrier sheet with the first layer 42 disposed thereon. So configured, the first layer roll 94 may be mounted, or otherwise secured, to a structure allowing the first layer roll 94 to continuous unroll in response to the conveyor belt 91 moving. In some examples, the first layer roll 94 can be disposed within a container having an opening through which the carrier sheet with the first layers 42 passes. The opening of the container can have a cover that allows the carrier sheet to pass through while mitigation, or preventing, debris from entering the container.

The supply of second layers 42 may be a second layer roll 96 formed by disposing multiple second layers on a carrier sheet where each second layer 46 is disposed a fixed distance from every other second layer 46. The second layer roll 96 may be operably coupled to the conveyor belt 91 such the second layer roll 96 unrolls under the force exerted thereon as the as the conveyor belt 91 moves forward thereby providing a continuous stream of the carrier sheet with the second layer 46 disposed thereon. So configured, the second layer roll 96 may be mounted, or otherwise secured, to a structure allowing the second layer roll 96 to continuous unroll in response to the conveyor belt 91 moving. In some examples, the second layer roll 96 can be disposed within a container having an opening through which the carrier sheet with the second layers 46 passes. The opening of the container can have a cover that allows the carrier sheet to pass through while mitigation, or preventing, debris from entering the container.

It is desirable, for example, that the distance between each inlay 38 disposed on the inlay roll 92, the distance between each first layer 42 disposed on the first layer roll 94, and the distance between each second layer 46 disposed on the second layer roll 96 be substantially the same. In other examples, however, rather than having a carrier sheet with first layers 42 or second layers 46 disposed thereon, the first layer roll 94 and the second layer roll 96 can be made entire from the material used to form the first layer 42 and second layer 46, respectively. In such examples, the inlays 38 disposed on the carrier sheet 86 can be disposed from every other inlay 38 disposed thereby on any distance that may assist with the assembly of the location designation RFID tags.

As illustrated in FIG. 7, the inlay roll 92 may be disposed toward a beginning of the conveyor belt 91, the first layer roll 94 may be disposed a first distance from the inlay roll 92 proximate the conveyor belt 91, and the second layer roll 96 may be disposed a second distance from the inlay roll 92 proximate the conveyor belt 91. The first and second distances may be great enough such that the inlay roll 92 may be inspected prior to reaching the first layer roll 94 and/or the second layer roll 96. In particular, the first and second distances may be substantially similar such that the first layer roll 94 is disposed above the conveyor belt 91 while the second layer roll 96 is disposed below the conveyor belt 91. Doing so may allow the first layer 42 and the second layer 46 to be simultaneously applied to either side of the carrier sheet 86 with the inlay 38 disposed thereon. However, the first distance can be different from the second distance in other examples.

The assembly line 90 may also include a supply of printing layers 95 as well as a supply of laminate 97, which may be operably coupled to the conveyor belt 91 in a similar manner as the supplies of first and second layers. In particular, the supply of printing layers 95 and the supply of laminate 97 may be disposed away from both the supply of first layers and the supply of second layers so as not to interfere with the application of the first and second layers 42, 46 to the inlays 38. In other examples of the assembly line 90, the inlay roll 92 may be configured to accept the carrier sheet 86 of another inlay roll 92 providing a seamless transition from one inlay roll 92 to another. The first layer roll 94, the second layer roll 96, the supply of printing layers, and the supply of laminate can also be so configured, which may prevent, or at least mitigate, the need for a significant downtime to replenish the supply of the various components used to assemble the location designation RFID tags 14.

The assembly line 90 may also include an applicator 97 for securing the first and second layers 42, 46 to the inlay 38 and a cutter 98 capable to cutting, puncturing, punching, perforating, or otherwise modifying the inlay roll 92, the first layer roll 94, and the second layer roll 96 before or after assembly of the location designation RFID tag 14. As illustrated in FIG. 7, the applicator 97 is disposed on the assembly line 90 such that the conveyor belt passes through the applicator 97. The application 97 may act upon the first layer 42, the inlay 38, and the second layer 46 in a variety of ways that are dependent on how the first and second layers 42, 46 are to be secured to the inlay 38. For example, the first and second layers 42, 46 can have an adhesive applied to at least one side that secures the first and second layers 42, 46 to the inlay 38 upon making contact with the inlay 38. In such an example, the applicator 97 simultaneously applies a force to both the first and second layers 42, 46 as the conveyor belt 91 passes through the applicator 97 thereby ensuring the first and second layers 42, 46 are properly adhered to the inlay 38. As another example, the first and second layers 42, 46 can have a heat activated adhesive applied to at least one side thereof. In such an example, the applicator 97 can supply the heat necessary to activate the adhesive as the conveyor belt 91 passes through the applicator 97 thereby securing the first and second layers 42, 46 to the inlay 38.

Similarly, the cutter 98 may be disposed on the assembly line 90 such that the conveyor belt 91 passes through or near the cutter 98. In particular, as illustrated in FIG. 7, the cutter 98 may be disposed on the conveyor belt 91 after the applicator 97 thereby interacting with the location designation RFID tag 14 after it has been formed. For example, the cutter 98 can cut individual location designation RFID tags 14 away from the carrier sheet 86 or other excess material. Alternatively, the cutter 98 can perforate, or otherwise puncture, the carrier sheet 86 such that individual location designation RFID tags 14 or groups of location designation RFID tags 14 can be torn away from the carrier sheet 86. Additionally, the cutter 98 may both cut and perforate the carrier sheet 86 such that the carrier sheet 86 is divided into segments that are easily shipped or delivered to a facility using the location designation RFID tags 14.

Referring now to FIG. 8, which illustrates the method of forming the location designation RFID tags 14 using the assembly line 90 illustrated in FIG. 7. The method includes providing the supply of inlays, the supply of first layers, and the supply of second layers (step 100). Once each supply is properly coupled to the conveyor belt 91, the first layer 42 is disposed on a first side of the carrier sheet 86, so that each inlay 38 is substantially covered by the first layer (step 104). The second layer 46 is then disposed on a second side of the carrier sheet 86, so that each of the inlay 38 is substantially covered by the second layer (step 108). The application of the first and second layers 42, 46 can be applied to the carrier sheet 86 simultaneously in some examples, or the first and second layers 42, 46 can be applied to the carrier sheet 86 one after another, in other examples. Once the first and second layers 42, 46 are disposed on the first and second sides of the carrier sheet 86, respectively, the method includes adhering or securing the first and second layers 42, 46 to the carrier sheet 86 using the applicator 97 (step 112). After the first and second layers 42, 46 are adhered to the carrier sheet 86, an adhesive is applied to at least one of the first or second layers 42, 46 (step 116). The method may also include disposing a removably layer over the applied adhesive thereby preventing the assembled location designation RFID tag 14 from inadvertently adhering to a surface. Once the adhesive is applied, the method includes cutting, puncturing, and/or perforating the carrier sheet 86 (step 120).

Once the location designation RFID tags 14 are assembled and disposed on the carrier sheet 86, the carrier sheet 86 containing the assembled location designation RFID tags 14 may be rolled or otherwise packaged so that the carrier sheet can be loaded into an application device that allows the location designation RFID tags 14 to be rolled onto a surface (e.g., the floor or other structure) rather than peeled manually off of the carrier sheet and affixed to the surface. Such an application device allows the location designation RFID tags 14 to be placed on surfaces faster and more efficiently than peeling and placing the location designation RFID tags 14 manually. Further, the application device may be programmed to deposit the location designation RFID tags 14 at a preset distance from one another. For example, the location designation RFID tags 14 can spaced at least twelve (12) inches apart from one another. The application device can also deposit the location designation RFID tags 14 at variable distances from one another, in some examples, and can deposit the location designation RFID tags at constant distances from one another, in other examples.

Those skilled in the art will recognize that a wide variety of modifications, alterations, and combinations can be made with respect to the above described examples without departing from the scope of the disclosure, and that such modifications, alterations, and combinations are to be viewed as being within the ambit of the inventive concept.

I claim:

1. A location designation radio frequency identification (RFID) tag for use in a facility, the RFID tag comprising:
 an inlay having a first side, a second side opposite the first side, the inlay further comprising:
  an antenna,
  an integrated circuit, and
  a substrate, the antenna and the integrated circuit being disposed on the substrate;
 a first layer disposed on the first side of the inlay, the first layer having a first thickness;
 a second layer disposed on the second side of the inlay, the second layer having a second thickness; and
 a first lamination layer disposed on the first layer such that the first layer is disposed between the first side of the inlay and the first lamination layer, the first lamination layer being coupled to a floor in the facility to encapsulate the inlay, the first layer, and the second layer between the floor and the first lamination layer.

2. The location designation RFID tag of claim 1, further comprising a printing layer fixedly disposed on the first layer such that the printing layer accepts printing.

3. The location designation RFID tag of claim 1, wherein the second layer has a first side and a second side, the first side being disposed near the inlay and the second side being disposed opposite the inlay, and
wherein the second side of the second layer includes an adhesive disposed thereon.

4. The location designation RFID tag of claim 1, wherein the inlay includes a length between 1 to 10 inches and a width between 0.10 to 10 inch.

5. The location designation RFID tag of claim 1, wherein the inlay includes a length between 3 to 4 inches and a width between 0.10 to 1 inch.

6. The location designation RFID tag of claim 1, wherein the inlay includes a length approximately equal to 3.55 inches and a width approximately equal to 0.75 inch.

7. The location designation RFID tag of claim 1, wherein the first thickness is approximately between 0.10 inches and 0.30 inches.

8. The location designation RFID tag of claim 1, wherein the first thickness is approximately 0.1095 inches.

9. The location designation RFID tag of claim 1, wherein the second thickness is approximately between 0.10 inches and 0.300 inches.

10. The location designation RFID tag of claim 1, wherein the second thickness is approximately 0.1095 inches.

11. The location designation RFID tag of claim 1, wherein the first layer is attached to the inlay using a first adhesive and the second layer is attached to the inlay using a second adhesive.

12. The location designation RFID tag of claim 11, wherein the first and second adhesives are the same.

13. The location designation RFID tag of claim 1, further comprising a second lamination layer disposed on the second layer.

14. The location designation RFID tag of claim 11, wherein the adhesive is cyanoacrylates, structural acrylic, or epoxy.

15. The location designation RFID tag of claim 1, having a length in a first direction, a width in a second direction that is perpendicular to the first direction, and a thickness in a third direction that is perpendicular to the first and second direction,
wherein the length is between 2 and 10 inches, the width is between 0.5 and 5 inches, and the thickness is between 0.10 and 0.30 inches.

16. The location designation RFID tag of claim 15, wherein the length is approximately 4 inches, the width is approximately 1 inch, and the thickness is approximately 0.236 inches.

17. The location designation RFID tag of claim 1, wherein the first thickness is substantially equal to the second thickness.

18. The location designation RFID tag of claim 1, wherein the first thickness is less than the second thickness.

19. The location designation RFID tag of claim 1, wherein the first layer is a semi-rigid polyester, a rigid polyvinyl chloride (PVC), a polycarbonate, a polyethylene, or a polypropylene.

20. A method of reading at least one location designation RFID tag disposed on a floor of a facility having a mobile device disposed therein, the method comprising:
associating each of a plurality of location designation RFID tags with respective location information for corresponding ones of a plurality of locations;
placing the plurality of location designation RFID tag at the corresponding ones of the plurality of locations on the floor of the facility, each of the plurality of location designation RFID tags including an inlay including an antenna and an integrated circuit, a first side, and a second side opposite the first side, a first layer disposed on the first side of the inlay having a first thickness, a second layer disposed on the second side of the inlay having a second thickness, and a first lamination layer disposed on the first layer, the first layer disposed between the first lamination layer and the first side of the inlay, the first lamination layer being coupled to ene of the floor of the facility to encapsulate the inlay, the first layer, and the second layer between the floor and the first lamination layer, each of the plurality of location designation RFID tags having a length in a first direction and a width in a second direction perpendicular to the first direction;
reading, via a reader disposed on the mobile device, at least one location designation RFID tag from among the plurality of location designation RFID tags as the mobile device travels over or near the at least one location designation RFID tag;
detecting, based on the reading of the at least one location designation RFID tag and based on corresponding location information associated with the at least one RFID tag, a location within the facility.

21. The method of claim 20, wherein the placing the plurality of location designation RFID tags comprises orienting each of the plurality of location designation RFID tags such that the lengths of the plurality of location designation RFID tags are perpendicular to a direction of travel of the mobile device.

22. The method of claim 20, wherein the reading comprises orienting the reader on the mobile device such that the reader is perpendicular to the length of the at least one location designation RFID tag.

23. The method of claim 20, wherein the placing the at least one location designation RFID tag comprises placing at first location designation RFID tag at least twelve (12) inches away from a second location designation RFID tag from among the plurality of location designation RFID tags.

24. The method of claim 23, wherein the placing the at least one location designation RFID tag comprises orienting the first location designation RFID tag in parallel with the second location designation RFID tag.

25. A method of manufacturing at least one location designation RFID tag for use on a floor in a facility, the method comprising:
providing a supply of inlays disposed on a carrier sheet, a supply of first layers, and a supply of second layers;
coupling the supply of inlays at a first location of a conveyer belt, the supply of first layer at a second location on the conveyer belt, and the supply of second layers at a third location on the conveyer belt;
attaching a first layer from the supply of first layers to a first side of the carrier sheet, each first layer in the supply of first layers having a first thickness;
attaching a second layer from the supply of second layers to a second side of the carrier sheet, each second layer in the supply of second layers having a second thickness, such that the at least one inlay is disposed between the first layer and the second layer; and applying a first lamination layer to the first layer such that the first layer is disposed between the first lamination layer and the inlay, and such that the first lamination layer encapsulates the inlay, the first layer, and the second layer between the floor and the first lamination layer when the at least one location designation RFID tag is placed on the floor in the facility.

26. The method of claim 25, further comprising attaching a printing layer onto either the first layer or the second layer.

27. The method of claim 25, further comprising applying an adhesive to at least one of the first layer and the second layer.

28. The method of claim 25, further comprising applying a second lamination layer to the second layer.

\* \* \* \* \*